US009088757B2

(12) United States Patent
Curtis et al.

(10) Patent No.: US 9,088,757 B2
(45) Date of Patent: Jul. 21, 2015

(54) METHOD AND SYSTEM FOR SOCIALLY RANKING PROGRAMS

(75) Inventors: Scott Curtis, Durham, NC (US); Christopher M. Amidon, Apex, NC (US); Gregory M. Evans, Raleigh, NC (US)

(73) Assignee: Eloy Technology, LLC, Wilmington, DE (US)

( * ) Notice: Subject to any disclaimer, the term of this patent is extended or adjusted under 35 U.S.C. 154(b) by 304 days.

(21) Appl. No.: 12/731,817

(22) Filed: Mar. 25, 2010

(65) Prior Publication Data

US 2012/0117581 A1 May 10, 2012

Related U.S. Application Data

(60) Provisional application No. 61/163,086, filed on Mar. 25, 2009.

(51) Int. Cl.
| | | |
|---|---|---|
| H04N 5/445 | (2011.01) | |
| H04N 5/76 | (2006.01) | |
| H04N 21/462 | (2011.01) | |
| H04N 21/431 | (2011.01) | |
| H04N 21/475 | (2011.01) | |
| H04N 5/782 | (2006.01) | |
| H04N 5/765 | (2006.01) | |
| H04N 9/82 | (2006.01) | |

(52) U.S. Cl.
CPC ............ *H04N 5/76* (2013.01); *H04N 5/782* (2013.01); *H04N 21/4312* (2013.01); *H04N 21/4622* (2013.01); *H04N 21/4756* (2013.01); *H04N 5/765* (2013.01); *H04N 9/8205* (2013.01)

(58) Field of Classification Search
CPC ............ H04N 21/431; H04N 21/4312; H04N 21/475; H04N 21/4756
USPC ................................................ 725/46, 45, 44
See application file for complete search history.

(56) References Cited

U.S. PATENT DOCUMENTS

| | | |
|---|---|---|
| 4,468,732 A | 8/1984 | Raver |
| 4,694,490 A | 9/1987 | Harvey et al. |

(Continued)

FOREIGN PATENT DOCUMENTS

| | | |
|---|---|---|
| CA | 2271552 A1 | 6/1994 |
| WO | 95/32583 A1 | 11/1995 |

(Continued)

OTHER PUBLICATIONS

Abstract, "Netscape Communicator: Introduction to Communicator," Version 4, Netscape Communications, 1997, at <http://www.amazon.com/Netscape-Communicator-Introduction-Version/dp/0151049750>, printed Jun. 25, 2012, 4 pages.

(Continued)

*Primary Examiner* — James R Sheleheda

(57) ABSTRACT

A method and system for displaying program representation. Program rating information derived from a plurality of identified users regarding a plurality of programs is obtained. A social rank of the plurality of programs is determined based on the rating information. A plurality of program representations are displayed to a viewer, wherein the program representations represent corresponding ones of the plurality of programs and wherein a differentiating visual characteristic of each of the plurality of program representations is based on the social ranking.

27 Claims, 12 Drawing Sheets

(56) References Cited

U.S. PATENT DOCUMENTS

| | | |
|---|---|---|
| 4,704,725 A | 11/1987 | Harvey et al. |
| 4,827,447 A | 5/1989 | Croes et al. |
| 4,956,774 A | 9/1990 | Shibamiya et al. |
| 4,965,825 A | 10/1990 | Harvey et al. |
| 5,109,414 A | 4/1992 | Harvey et al. |
| 5,115,501 A | 5/1992 | Kerr |
| 5,121,478 A | 6/1992 | Rao |
| 5,223,924 A | 6/1993 | Strubbe |
| 5,233,654 A | 8/1993 | Harvey et al. |
| 5,335,277 A | 8/1994 | Harvey et al. |
| 5,347,632 A | 9/1994 | Filepp et al. |
| 5,353,121 A | 10/1994 | Young et al. |
| 5,367,686 A | 11/1994 | Fisher et al. |
| 5,404,510 A | 4/1995 | Smith et al. |
| 5,412,808 A | 5/1995 | Bauer |
| 5,446,891 A | 8/1995 | Kaplan et al. |
| 5,526,034 A | 6/1996 | Hoarty et al. |
| 5,528,304 A | 6/1996 | Cherrick et al. |
| 5,530,852 A | 6/1996 | Meske, Jr. et al. |
| 5,550,576 A | 8/1996 | Klosterman |
| 5,579,055 A | 11/1996 | Hamilton et al. |
| 5,585,865 A | 12/1996 | Amano et al. |
| 5,587,734 A | 12/1996 | Lauder et al. |
| 5,592,660 A | 1/1997 | Yokota et al. |
| 5,594,507 A | 1/1997 | Hoarty |
| 5,594,509 A | 1/1997 | Florin et al. |
| 5,596,373 A | 1/1997 | White et al. |
| 5,598,536 A | 1/1997 | Slaughter, III et al. |
| 5,600,378 A | 2/1997 | Wasilewski |
| 5,630,119 A | 5/1997 | Aristides et al. |
| 5,652,613 A | 7/1997 | Lazarus et al. |
| 5,666,645 A | 9/1997 | Thomas et al. |
| 5,694,176 A | 12/1997 | Bruette et al. |
| 5,695,400 A | 12/1997 | Fennell, Jr. et al. |
| 5,696,897 A | 12/1997 | Dong |
| 5,701,451 A | 12/1997 | Rogers et al. |
| 5,710,884 A | 1/1998 | Dedrick |
| 5,712,129 A | 1/1998 | Ford |
| 5,712,979 A | 1/1998 | Graber et al. |
| 5,717,860 A | 2/1998 | Graber et al. |
| 5,719,786 A | 2/1998 | Nelson et al. |
| 5,727,129 A | 3/1998 | Barrett et al. |
| 5,737,599 A | 4/1998 | Rowe et al. |
| 5,754,938 A | 5/1998 | Herz et al. |
| 5,754,939 A | 5/1998 | Herz et al. |
| 5,758,257 A | 5/1998 | Herz et al. |
| 5,760,838 A | 6/1998 | Adams et al. |
| 5,761,662 A | 6/1998 | Dasan |
| 5,774,664 A | 6/1998 | Hidary et al. |
| 5,778,187 A | 7/1998 | Monteiro et al. |
| 5,784,058 A | 7/1998 | LaStrange et al. |
| 5,784,608 A | 7/1998 | Meske, Jr. et al. |
| 5,793,438 A | 8/1998 | Bedard |
| 5,801,747 A | 9/1998 | Bedard |
| 5,801,753 A | 9/1998 | Eyer et al. |
| 5,812,123 A | 9/1998 | Rowe et al. |
| 5,813,007 A | 9/1998 | Nielsen |
| 5,819,301 A | 10/1998 | Rowe et al. |
| 5,854,897 A | 12/1998 | Radziewicz et al. |
| 5,867,495 A | 2/1999 | Elliott et al. |
| 5,887,243 A | 3/1999 | Harvey et al. |
| 5,893,091 A | 4/1999 | Hunt et al. |
| 5,907,843 A | 5/1999 | Cleron et al. |
| 5,923,362 A | 7/1999 | Klosterman |
| 5,945,988 A | 8/1999 | Williams et al. |
| 5,948,040 A | 9/1999 | DeLorme et al. |
| 5,977,964 A | 11/1999 | Williams et al. |
| 5,986,656 A | 11/1999 | Crutcher et al. |
| 5,990,890 A | 11/1999 | Etheredge |
| 6,005,563 A | 12/1999 | White et al. |
| 6,034,683 A | 3/2000 | Mansour et al. |
| 6,072,486 A | 6/2000 | Sheldon et al. |
| 6,119,098 A | 9/2000 | Guyot et al. |
| 6,141,058 A | 10/2000 | Lagoni et al. |
| 6,311,175 B1 | 10/2001 | Adriaans et al. |
| 6,317,881 B1 * | 11/2001 | Shah-Nazaroff et al. ........ 725/24 |
| 6,349,297 B1 | 2/2002 | Shaw et al. |
| 6,351,467 B1 | 2/2002 | Dillon |
| 6,388,714 B1 | 5/2002 | Schein et al. |
| 6,434,621 B1 | 8/2002 | Pezzillo et al. |
| 6,442,598 B1 | 8/2002 | Wright et al. |
| 6,459,427 B1 | 10/2002 | Mao et al. |
| 6,476,827 B1 | 11/2002 | Porter |
| 6,486,892 B1 | 11/2002 | Stern |
| 6,614,890 B2 | 9/2003 | Perlman et al. |
| 6,647,389 B1 | 11/2003 | Fitch et al. |
| 6,735,701 B1 | 5/2004 | Jacobson |
| 6,754,904 B1 * | 6/2004 | Cooper et al. .................... 725/32 |
| 6,760,916 B2 | 7/2004 | Holtz et al. |
| 6,772,433 B1 | 8/2004 | LaJoie et al. |
| 6,823,344 B1 | 11/2004 | Isensee et al. |
| 6,986,154 B1 | 1/2006 | Price et al. |
| 7,096,486 B1 | 8/2006 | Ukai et al. |
| 7,149,511 B1 | 12/2006 | Bachner, III et al. |
| 7,185,355 B1 | 2/2007 | Ellis et al. |
| 7,197,713 B2 | 3/2007 | Stern |
| 7,373,650 B1 | 5/2008 | Rodriguez et al. |
| 7,395,514 B2 | 7/2008 | Stern |
| 7,454,777 B1 | 11/2008 | Nishikawa et al. |
| 7,571,452 B2 * | 8/2009 | Gutta ............................. 725/46 |
| 7,634,466 B2 * | 12/2009 | Rose et al. ......................... 1/1 |
| 7,689,510 B2 | 3/2010 | Lamkin et al. |
| 7,779,097 B2 | 8/2010 | Lamkin et al. |
| 7,849,486 B2 | 12/2010 | Russ et al. |
| 7,895,625 B1 * | 2/2011 | Bryan et al. .................... 725/46 |
| 7,987,490 B2 | 7/2011 | Ansari et al. |
| 8,024,765 B2 * | 9/2011 | Ramanathan et al. ........ 725/110 |
| 8,046,697 B2 | 10/2011 | Stern |
| 2001/0023401 A1 | 9/2001 | Weishut et al. |
| 2002/0038387 A1 | 3/2002 | Fuiks et al. |
| 2002/0053078 A1 | 5/2002 | Holtz et al. |
| 2002/0053081 A1 | 5/2002 | Griggs |
| 2002/0174428 A1 * | 11/2002 | Agnihotri et al. ............... 725/46 |
| 2002/0175931 A1 | 11/2002 | Holtz et al. |
| 2002/0186233 A1 | 12/2002 | Holtz et al. |
| 2003/0038840 A1 | 2/2003 | Stern |
| 2003/0048299 A1 | 3/2003 | Stern |
| 2003/0048808 A1 | 3/2003 | Stahl et al. |
| 2003/0051246 A1 | 3/2003 | Wilder et al. |
| 2003/0052916 A1 | 3/2003 | Stern |
| 2003/0066074 A1 * | 4/2003 | Zimmerman et al. ........... 725/14 |
| 2003/0084452 A1 | 5/2003 | Ryan et al. |
| 2003/0088410 A1 | 5/2003 | Geidl et al. |
| 2003/0093793 A1 * | 5/2003 | Gutta ............................. 725/46 |
| 2003/0184598 A1 | 10/2003 | Graham |
| 2003/0200336 A1 | 10/2003 | Pal et al. |
| 2003/0237093 A1 | 12/2003 | Marsh |
| 2004/0003393 A1 | 1/2004 | Gutta et al. |
| 2004/0003400 A1 | 1/2004 | Carney et al. |
| 2004/0025180 A1 | 2/2004 | Begeja et al. |
| 2004/0049787 A1 | 3/2004 | Maissel et al. |
| 2004/0060061 A1 | 3/2004 | Parker |
| 2004/0068739 A1 | 4/2004 | Russ et al. |
| 2004/0078807 A1 | 4/2004 | Fries et al. |
| 2004/0078814 A1 | 4/2004 | Allen |
| 2004/0131336 A1 | 7/2004 | Matsuno et al. |
| 2004/0221308 A1 | 11/2004 | Cuttner et al. |
| 2004/0268403 A1 | 12/2004 | Krieger et al. |
| 2005/0022241 A1 | 1/2005 | Griggs |
| 2005/0138658 A1 | 6/2005 | Bryan |
| 2005/0149987 A1 | 7/2005 | Boccon-Gibod et al. |
| 2005/0155052 A1 | 7/2005 | Ostrowska et al. |
| 2005/0183110 A1 | 8/2005 | Anderson |
| 2005/0187895 A1 | 8/2005 | Paya et al. |
| 2005/0193015 A1 | 9/2005 | Logston et al. |
| 2005/0251822 A1 | 11/2005 | Knowles et al. |
| 2005/0251827 A1 | 11/2005 | Ellis et al. |
| 2006/0020973 A1 | 1/2006 | Hannum et al. |
| 2006/0031203 A1 | 2/2006 | Rosenbaum et al. |
| 2006/0035610 A1 | 2/2006 | Potrebic |
| 2006/0117354 A1 | 6/2006 | Schutte et al. |
| 2006/0123010 A1 | 6/2006 | Landry et al. |
| 2006/0150214 A1 | 7/2006 | Ramraz et al. |
| 2006/0159109 A1 | 7/2006 | Lamkin et al. |

(56) References Cited

U.S. PATENT DOCUMENTS

| | | | |
|---|---|---|---|
| 2006/0161635 A1 | 7/2006 | Lamkin et al. | |
| 2006/0161953 A1 | 7/2006 | Walter et al. | |
| 2006/0168126 A1 | 7/2006 | Costa-Requena et al. | |
| 2006/0212906 A1 | 9/2006 | Cantalini | |
| 2006/0218581 A1 | 9/2006 | Ostrowska et al. | |
| 2006/0253417 A1 | 11/2006 | Brownrigg et al. | |
| 2006/0259926 A1 | 11/2006 | Scheelke et al. | |
| 2006/0271997 A1 | 11/2006 | Jacoby et al. | |
| 2006/0282851 A1 | 12/2006 | Errico et al. | |
| 2006/0282852 A1 | 12/2006 | Purpura et al. | |
| 2007/0011702 A1 | 1/2007 | Vaysman | |
| 2007/0058924 A1 | 3/2007 | Yeh | |
| 2007/0101368 A1 | 5/2007 | Jacoby et al. | |
| 2007/0112935 A1 | 5/2007 | Espelien | |
| 2007/0143128 A1 | 6/2007 | Tokarev et al. | |
| 2007/0143260 A1 | 6/2007 | Markov et al. | |
| 2007/0157237 A1 | 7/2007 | Cordray et al. | |
| 2007/0169148 A1 | 7/2007 | Oddo et al. | |
| 2007/0250896 A1 | 10/2007 | Parker et al. | |
| 2007/0288960 A1 | 12/2007 | Akiyama | |
| 2007/0294249 A1 | 12/2007 | Feyaerts | |
| 2008/0034043 A1 | 2/2008 | Gandhi et al. | |
| 2008/0086746 A1 | 4/2008 | King | |
| 2008/0092056 A1 | 4/2008 | Walter et al. | |
| 2008/0134043 A1 | 6/2008 | Georgis et al. | |
| 2008/0134053 A1 | 6/2008 | Fischer | |
| 2008/0163059 A1 | 7/2008 | Craner | |
| 2008/0168495 A1 | 7/2008 | Roberts et al. | |
| 2008/0276279 A1* | 11/2008 | Gossweiler et al. | 725/46 |
| 2009/0015657 A1 | 1/2009 | Wong | |
| 2009/0024910 A1 | 1/2009 | Kamat et al. | |
| 2009/0055868 A1 | 2/2009 | Wehmeyer et al. | |
| 2009/0150806 A1 | 6/2009 | Evje et al. | |
| 2009/0158337 A1 | 6/2009 | Stiers et al. | |
| 2009/0165046 A1* | 6/2009 | Stallings et al. | 725/39 |
| 2009/0165053 A1 | 6/2009 | Thyagarajan et al. | |
| 2009/0254557 A1 | 10/2009 | Jordan | |
| 2009/0260038 A1 | 10/2009 | Acton et al. | |
| 2009/0265737 A1* | 10/2009 | Issa et al. | 725/38 |
| 2009/0271820 A1* | 10/2009 | Choi et al. | 725/37 |
| 2009/0293079 A1* | 11/2009 | McKee et al. | 725/10 |
| 2009/0293088 A1 | 11/2009 | Mukerji et al. | |
| 2009/0310030 A1 | 12/2009 | Litwin et al. | |
| 2010/0037274 A1 | 2/2010 | Meuninck et al. | |
| 2010/0070995 A1 | 3/2010 | Pan | |
| 2010/0077435 A1* | 3/2010 | Kandekar et al. | 725/61 |
| 2010/0114857 A1 | 5/2010 | Edwards et al. | |
| 2010/0115554 A1 | 5/2010 | Drouet et al. | |
| 2010/0131977 A1 | 5/2010 | San Jule et al. | |
| 2010/0162172 A1 | 6/2010 | Aroner | |
| 2010/0162314 A1* | 6/2010 | Meare | 725/44 |
| 2010/0162321 A1 | 6/2010 | Bradley | |
| 2010/0186029 A1 | 7/2010 | Kim et al. | |
| 2010/0186034 A1 | 7/2010 | Walker | |
| 2010/0199312 A1 | 8/2010 | Chang et al. | |
| 2011/0131593 A1* | 6/2011 | Scott et al. | 725/9 |
| 2011/0191318 A1* | 8/2011 | Gilbey et al. | 707/706 |
| 2012/0072851 A1 | 3/2012 | Stern | |
| 2012/0117471 A1 | 5/2012 | Amidon et al. | |
| 2012/0117488 A1 | 5/2012 | Amidon et al. | |
| 2012/0117595 A1 | 5/2012 | Svendsen et al. | |
| 2012/0117598 A1 | 5/2012 | Pons et al. | |
| 2013/0061263 A1* | 3/2013 | Issa et al. | 725/32 |

FOREIGN PATENT DOCUMENTS

| | | | |
|---|---|---|---|
| WO | 97/17793 A1 | 5/1997 | |
| WO | 99/35849 A1 | 7/1999 | |

OTHER PUBLICATIONS

Abstract, "The Art of Human-Computer Interface Design," eds. Brenda Laurel and S. Joy Mountford, copyright 1990, Addison-Wesley Longman Publishing Col, Inc., Boston, Massachusetts, at <http://dl.acm.org/citation.cfm?id=575201>, from the ACM Digital Library, printed Jun. 26, 2012, 2 pages.

Abstract, Norman, Donald A., "The Invisible Computer," The MIT Press, Sep. 1998, copyright 1998, Donald A. Norman, at <http://mitpress.mit.edu/catalog/item/default.asp?ttype=2&tid=5160>, printed Jun. 25, 2012, 1 page.

Abstract, Rheingold, Howard, "Tools for Thought, the People and Ideas Behind the Next Computer Revolution," Simon & Shuster, New York, 1985, 2 pages.

Ali-Hasan, Noor F., "Exploring Social Media Scenarios for the Television," Proceedings of the International Conference on Weblogs and Social Media 2008 (ICWSM 2008), Mar. 30-Apr. 2, 2008, Seattle, Washington, copyright 2008, Association for the Advancement of Artificial Intelligence (AAAI) Press, Menlo Park, California, 8 pages.

"Average U.S. Home Now Recieves a Record 118.6 TV Channels," at <http://www.nielsenmedia.com/nc/portal/site/Public/menuitem . . . >, Jun. 6, 2008, Nielsen Media Research, from Internet Archive, printed May 10, 2011, 2 pages.

Bott, Ed and Person, Ron, "Special Edition Using Windows 95 with Internet Explorer," ISBN 0789715538, copyright 1998, Que Corporation, excerpt from Chapter 19, found at <http://proquest.safaribooksonline.com/?x=1&mode=print&sortKey=title&sortOrder=asc&vie . . . >, printed Jun. 18, 2004, 4 pages.

Chang, Jui-Hung et al., "3PRS: a personalized popular program recommendation system for digital TV for P2P social networks," Multimed Tools Appl, vol. 47, pp. 31-48, 2010, published online Nov. 7, 2009, copyright 2009, Springer Science + Business Media, LLC, 18 pages.

Curro, Tony, "Express," Express by Infoseek internet web page, updated Oct. 27, 1998, copyright 1992-1998, Tony Curro, printed Nov. 18, 1998, 5 pages.

Davis, Jim, "The Miracle Box," CNET News.Com, Nov. 17, 1998, copyright 1995-1998, CNET, Inc., printed Nov. 20, 1998, 4 pages.

"Dynamic Media.Com Opens for Business Just in Time for the Holidays," Business Wire, Dec. 3, 1998, copyright 1998, Business Wire, printed Dec. 4, 1998, 2 pages.

"EXPWAY," Company, at <http://www.expway.com/company.php>, from the Internet Archive, dated Dec. 20, 2008, printed Jun. 7, 2012, 1 page.

Foley, James et al., "The Human Factors of Computer Graphics Interaction Techniques," IEEE CG&A, Nov. 1984, copyright 1984, IEEE, pp. 13-48, 36 pages.

"GeoCities and RealNetworks Team Up to Enable More Than 3 Million Homesteaders to Become Internet Broadcasters," PRNewswire, Company Press Release, RealNetworks, Inc., Mar. 1, 1999, copyright 1999, PRNewswire, printed Mar. 1, 1999, 4 pages.

Gibbs, W.W., "Taking Computers to Task," Scientific American, vol. 277, No. 1, Jul. 1997, pp. 282-289, 9 pages.

Henderson, Jr., D.A. and Card, S.K., "Rooms: The Use of Multiple Virtual Workspace to Reduce Space Contention in a Windows-Based Graphical Users Interface," Association for Computer Machinery, ACM Transactions on Graphics, vol. 5, No. 3, Jul. 1986, copyright 1987, ACM, pp. 211-243, 33 pages.

Hu, Jim, "Searching expressly on Infoseek," CNET News.com, Sep. 16, 1998, at <http://news.cnet.com/news/0-1005-200-333279.html?tag=st.ne.1002 . . . >, copyright 1995-1999, CNET, Inc., printed Dec. 1, 1999, 3 pages.

"i-Watch DV-CUBE," brochure and technical specification, date unknown but obtained on or prior to May 19, 2009, 2 pages.

"Interactive Demo—Part 1—YouTube," Vision TV Interactive Demonstration, posted by yanikit on Mar. 12, 2009, printed Jun. 7, 2012, 3 pages.

Jameson, A. et al., "Enhancing Mutual Awareness in Group Recommender Systems," in B. Mobasher & S.S. Anand (Eds.), Proceedings of the Int. Joint Conference on Artificial Intelligence 2003 Workshop on Intelligent Techniques for Web Personalization, Aug. 9-15, 2003, Acapulco, Mexico, 8 pages.

Johnson, Jeff et al., "The Xerox Star: A Retrospective," Computer, No. 9, Sep. 1989, copyright 1989, IEEE, pp. 11-29, 18 pages.

Kelly, Susan Baake, "Mastering WordPerfect 5," copyright 1998, Sybex, Inc., Alameda, California, pp. 51-53 and 511-513, 9 pages.

(56) References Cited

OTHER PUBLICATIONS

Lee, Jae-Ho, "Automatic Video Management System Using Face Recognition and MPEG-7 Visual Descriptors," ETRI Journal, vol. 27, No. 6, Dec. 2005, pp. 806-809, 4 pages.
Livingston, Brian, Window Manager, "Free Windows tool makes meta searches a much easier task," World Electric internet web page, Nov. 2, 1998, printed Nov. 18, 1998, 3 pages.
"Macrovision—Digital Entertainment Technology Leader—Digital Conten . . . ," at <http://macrovision.com/>, from the Internet Archive, dated Feb. 16, 2009, copyright 2009, Macrovision Solutions Corporation, printed May 4, 2012, 1 page.
Maes, P., "Agents that Reduce Work and Information Overload," Communications of the Association for Computer Machinery, vol. 37, No. 7, Jul. 1994, pp. 31-40 and 146, 11 pages.
McNeill, Alison, "TrustedOpinion.com Offers Netflix Subscribers More Relevant Movie Recommendations," at <http://www.prlog.org/10029611-trustedopinion-com-offers-netflix-subscribers-more-releva . . . >, Sep. 5, 2007, Palo Alto, California, printed May 15, 2009, 2 pages.
"Microsoft and Wink Communications Collaborate to Speed Adoption of Interactive Television Based on the ATVEF Specification," Microsoft TV Solutions News, Jun. 3, 1999, at <http://www.microsoft.com/tv/news/ne_wink_01.asp>, copyright 1998-1999, Microsoft Corporation, printed Jun. 15, 1999, 2 pages.
"Microsoft Announces Television Software Platform: Microsoft TV Platform Adaptation Kit (TVPAK)," PressPass, Jun. 14, 1999, at <http://www.microsoft.com/PressPass/press/1999/Jun99/TVPAKpr.htm>, copyright 1999, Microsoft Corporation, printed Jun. 15, 1999, 10 pages.
"Microsoft's TV Platform Makes Broadband Services a Reality for Cable Industry," PressPass, Jun. 14, 1999, at <http://www.microsoft.com/PressPass/features/1999/06-14ncta.htm>, copyright 1999, Microsoft Corporation, printed Jun. 15, 1999, 4 pages.
"Next Generation Mobile TV Guides," V1.0, copyright 2009, TV Genius Ltd, originally found at <http://www.tvgenius.net/whitepapers/mobile.pdf>, 11 pages.
Pfaffenberger, Bryan, "Netscape Navigator: Surfing the Web and Exploring the Internet," 1995, Academic Press, Inc., pp. 88-90, 168-169, 110-111, and 286, 10 pages.
"ProNetLink.com will Broadcast the 1999 International Business Expo Live Over the Internet," PRNewswire, Mar. 1, 1999, copyright 1999, PRNewswire, printed Mar. 1, 1999, 2 pages.
"Ruel's Set-Top Net Page—Ruel's Review: Teknema Internet TV," Feb. 12, 1998, copyright 1996-1998, Ruel T. Hernandez, printed Nov. 20, 1998, 6 pages.
"Ruel's Set-Top Net Page—Ruel's Review: WebSurfer," Jul. 16, 1998, copyright 1996-1998, Ruel T. Hernandez, printed Nov. 20, 1998, 15 pages.
Selker, T., "Coach: A Teaching Agent that Learns," Communications of the Association for Computer Machinery, vol. 37, No. 7, pp. 92-99, Jul. 1994, 8 pages.
"Streaming Media—iParty Conference Call Available at A/V Newswire," Business Wire, Mar. 1, 1999, copyright 1999, Business Wire, printed Mar. 1, 1999, 1 page.
Tusch, R. et al., "Context-Aware UPnP-AV Services for Adaptive Home Multimedia Systems," International Journal of Digital Multimedia Broadcasting, vol. 2008, Article ID 835438, received Jun. 25, 2008, accepted Jul. 15, 2008, copyright 2008, Hindawi Publishing Corporation, 12 pages.
"TV Guide, TV Listings, Online Videos, Entertainment News and Celebrity News—TVGuide.com," at <http://www.tvguide.com,> from the Internet Archive, dated Feb. 1, 2009, printed Jun. 8, 2012, 3 pages.
"Video recorder scheduling code," Wikipedia, found at <http://en.wikipedia.org/wik/Video_recorder_scheduling_code>, last modified May 4, 2009, printed Jul. 13, 2011, 3 pages.

WebTV Ad, "Everything you want is on the Web (Everything you Need is on this Page.)," copyright 1997, Sony Electronics Inc., printed Nov. 20, 1998, 2 pages.
WebTV Ad, "Now Everyone Can Experience the Internet," copyright 1998, Sony Electronics Inc., printed Nov. 20, 1998, 1 page.
WebTV Ad, "Sony and WebTV give you the INTERNET . . . the EASY WAY," copyright 1995-1996, Sony Electronics Inc., printed Nov. 20, 1998, 2 pages.
WebTV Ad, "Sony and WebTV give you the Internet . . . the Easy Way," copyright 1997, Sony Electronics Inc., printed Nov. 20, 1998, 2 pages.
WebTV Ad, "Sony Brings the Internet to Your TV," copyright 1997, Sony Electronics, Inc., from the Internet Archive, dated Dec. 10, 1997, printed Jun. 22, 2012, 2 pages.
WebTV Ad, "Sony Consumer Electronics Guide—WebTV Internet Terminal," copyright 1998, Sony Electronics Inc., printed Nov. 20, 1998, 2 pages.
WebTV Ad, "Sony Consumer Electronics Guide: INT-W100," copyright 1998, Sony Electronics Inc., printed Nov. 20, 1998, 2 pages.
WebTV Ad, "Sony Consumer Electronics Guide: INT-W100," copyright 1998, Sony Electronics Inc., printed Nov. 20, 1998, 3 pages.
WebTV Ad, "Sony Consumer Electronics Guide: INT-W200," copyright 1998, Sony Electronics Inc., printed Nov. 20, 1998, 3 pages.
WebTV Ad, "Sony Consumer Electronics Guide: INT-W200," copyright 1998, Sony Electronics Inc., printed Nov. 20, 1998, 1 page.
WebTV Plus Internet web page, "TV Crossover Links," printed Nov. 20, 1998, 1 page.
WebTV Plus Internet web page, "TV Home," printed Nov. 20, 1998, 1 page.
WebTV Plus Internet web page, "TV Listings," printed Nov. 20, 1998, 1 page.
WebTV Plus Internet web page, "Web Home," printed Nov. 20, 1998, 1 page.
WebTV Plus Internet web page, "WEB PIP," printed Nov. 20, 1998, 1 page.
WebTV Plus Internet web page, "WebTV—E-Mail," printed Nov. 20, 1998, 1 page.
WebTV Plus Internet web page, "WebTV—Favorites," printed Nov. 20, 1998, 1 page.
WebTV Plus Internet web page, "WebTV—My WebTV," printed Nov. 20, 1998, 1 page.
WebTV Plus Internet web page, "WebTV—Search," printed Nov. 20, 1998, 1 page.
WebTV Plus Internet web page, "WebTV Plus," printed Nov. 20, 1998, 1 page.
"What is Express by Infoseek?," Express by Infoseek Internet web page, copyright 1996-1998, Infoseek Corporation, printed Nov. 18, 1998, 3 pages.
"What's New at Express by Infoseek," Express by Infoseek internet web page, earliest entry dated Sep. 16, 1998, copyright 1996-1998, Infoseek Corporation, printed Nov. 18, 1998, 3 pages.
"Widespread Deployment of Interactive TV Gains Steam With Fall Lineup of Enhanced Programming for WebTV Plus and WebTV for Windows," Microsoft TV Solutions, Jun. 14, 1999, at <http://www.microsoft.com/tv/news/ne_itvmom_01.asp>, copyright 1998-1999, Microsoft Corporation, 3 pages.
Wittig et al., "Intelligent Media Agents in Interactive Television Systems," Proceedings of the International Conference on Multimedia Computing and Systems, May 15-18, 1995, Washington, D.C., IEEE Comp. Soc. Press, pp. 182-189, 8 pages.
"XMLTV," at <http://xmltv.org/wiki/>, from the Internet Archive, dated Mar. 31, 2009, printd May 10, 2011, 4 pages.
Zimmerman, J. et al., "Chapter 5—TV Personalization System—Design of a TV Show Recommender Engine and Interface," Personalized Digital Television: Targeting Programs to Individual Viewers, eds. Ardissono, L., Kobsa, A., and Maybury, M., Kluwer Academic Publishers, Norwell, Massachusetts, 2004, 29 pages.

* cited by examiner

METHOD AND SYSTEM FOR SOCIALLY RANKING PROGRAMS

RELATED APPLICATIONS

This application claims the benefit of provisional patent application Ser. No. 61/163,086, filed Mar. 25, 2009, the disclosure of which is hereby incorporated herein by reference in its entirety.

FIELD OF THE DISCLOSURE

The present invention relates to identifying programs to a viewer, and in particular to providing program representations to a viewer that correspond to a social ranking of the programs.

BACKGROUND

Today's content providers, such as cable companies, provide hundreds of programming channels for viewers. Consequently, selecting a program to watch can be daunting. Because friends frequently have common interests, it would be useful at times to know what your friends, or like-minded people, are watching, or have otherwise indicated that they enjoy. Having access to such information with respect to current program options would quickly distinguish some programs from the hundreds of available choices. There is a need therefore, for a mechanism that provides a viewer an intuitive representation regarding how friends, or like-minded individuals, collectively rank programs which are currently available to be viewed.

SUMMARY

The present invention relates to presenting program representations of programs to a viewer based on a social ranking of corresponding programs. A program representation is a visual identifier that identifies a corresponding program. In one embodiment, a program representation may include a border within which the corresponding program is presented. The program representations have differentiating visual characteristics based on the social ranking of the corresponding programs. For example, a program representation of a first program having a social rank that is higher than the social rank of a second program may be larger than the program representation of the second program. Alternately, the program representation of the first program may have a background, or border, of a color that is different from the background, or border, of a color of the second program representation. The use of program representations having differentiating visual characteristics enable a viewer to easily and intuitively gauge the social significance of one program over another program.

In one embodiment, the social ranking is based on rating information derived from a plurality of identified users. The plurality of users may be identified, for example, based on a degree of separation between each user and a viewer. The degree of separation may be determined, for example, by a social network service of which the plurality of users and the viewer are members.

A media controller may send a social network server a viewer identifier and a threshold degree of separation value. The social network server can identify a plurality of users who have a social relationship with the viewer that meets the threshold degree of separation value. The social network server may send the media controller a list of user identifiers identifying such users, and program rating information provided by the users. The media controller may use the rating information to socially rank the programs. The media controller may then determine a differentiating visual characteristic for each of a plurality of program representations that correspond to the programs based on the corresponding social rank of the program, and cause a display of the program representations to the viewer.

In one embodiment, the program rating information includes information that identifies the one of the plurality of programs that the corresponding user is currently accessing, or has accessed in the past. Such program rating information may be referred to herein as implicit rating information. For example, the user may be accessing the program by viewing the program or by recording the program, or have previously viewed or recorded the program. The social ranking of programs may be based on the implicit rating information. In another embodiment, the users may be prioritized based on viewer preference information. For example, the viewer preference information may indicate that some users have higher priorities than other users. Thus, the social ranking may be based on a weighted average of the implicit ratings of users.

In another embodiment, the program rating information comprises explicit rating values that have been provided by the plurality of users. In particular, the explicit rating values may comprise values quantifying a subjective opinion of the program by the user. A social rank of the programs may be determined based on the explicit ratings.

In another embodiment, the plurality of users may be identified based on profile matching between a viewer profile and profiles of users of the social network service. In particular, the social network server may match attributes in a viewer profile to attributes in a user profile of each of a plurality of members of the social network service.

The media controller may send the social network server threshold match criteria identifying a threshold degree of similarity value that constitutes a match. The social network server can determine a plurality of users who have a profile that matches the viewer profile within the threshold degree of similarity value. The social network server may send the media controller a list of user identifiers identifying such users, and program rating information provided by the users. The media controller may use the program rating information to determine a social ranking of the programs. The media controller may then determine differentiating visual characteristic for each of a plurality of program representations that correspond to the programs based on the corresponding social rank of the program, and cause a display of the program representations to the viewer.

In one embodiment, the media controller may provide the social network server a program list identifying a number of programs. The social network server may provide program rating information relating only to those programs. In particular, the social network server may filter out any identified users that have not provided program rating information for one of the identified programs.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosed embodiments.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments of the present disclosure include a method for presenting program representations of programs to a viewer based on a social ranking of the programs. The social rank may be based on program rating information that is derived from a plurality of identified users. The identified users may have a direct or indirect social relationship with the viewer, or may be determined to be like-minded individuals that have common preferences with the viewer. The program rating information may be implicit rating information, such as which programs have been or are currently being accessed by the identified users, or may be explicit rating information, such as information identifying a subjective rating of the program by the identified users. The program rating information may be used to determine a social ranking of the programs with respect to one another. Program representations of the programs may be depicted to the viewer such that differentiating visual characteristics of the program representations are a function of the corresponding social rank of the programs.

Figure 1:
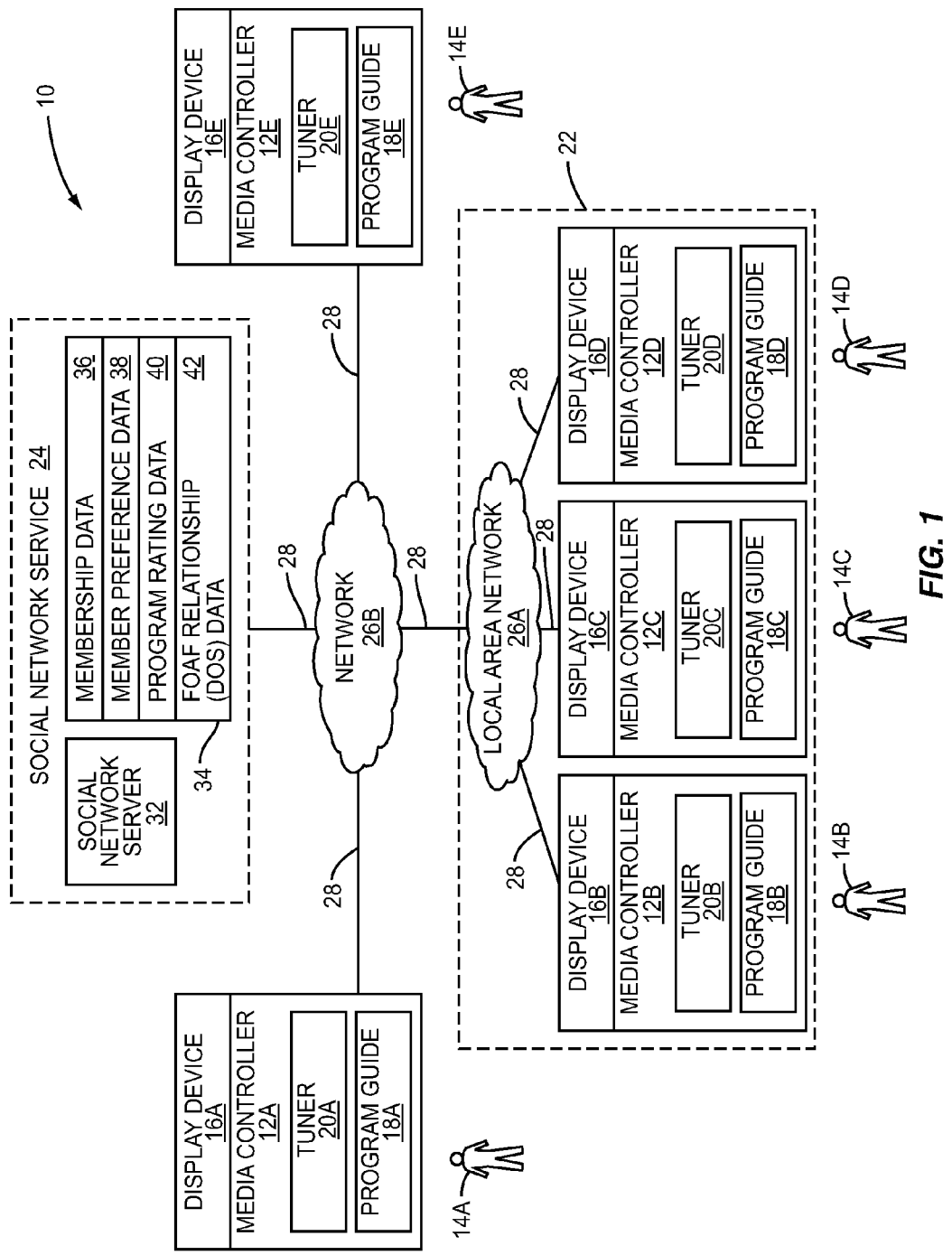
FIG. 1 illustrates a system in which embodiments may be practiced.

FIG. 1 illustrates a system 10 in which embodiments may be practiced. The system 10 includes a plurality of media controllers 12A-12E (generally, media controller 12 or media controllers 12). The media controllers 12 may comprise any device capable of providing, presenting, or otherwise causing the display of content upon request, such as, for example, a set top box, a digital video recorder, an intelligent gaming console, such as the Microsoft® Xbox®, Sony® PlayStation®, and Nintendo® GameCube®, a media console such as the Apple® TV®, a personal computer, and the like. The media controllers 12A-12E provide content to one or more corresponding viewers 14A-14E by causing a display on respective display devices 16A-16E (generally, display device 16 or display devices 16).

The display device 16 may comprise any display technology, such as a television, a computer monitor, a projector, and the like. By "causing" or "cause" to display it is meant that the media controllers 12 generate output streams that are provided to output connections on the media controllers 12 (not illustrated), which are directed to a corresponding display device 16, typically via a cable or other signal-carrying mechanism. While for purposes of illustration the media controllers 12 and display devices 16 are illustrated as devices which are separate from one another, the display device 16 may be integral with the media controller 12. For example, a single unit may include both a media controller 12, such as a digital video recorder, and a display device 16, such as a television. Where a media controller 12 and display device 16 are integral, the signal-carrying connection between the two may not be by a connection cable, but rather by an internal bus or other signal-carrying mechanism.

The media controller 12A receives content from content providers (not illustrated) which may include any provider of content, including service providers that provide content for a direct or indirect fee, cable operators, satellite operators, internet content providers, individuals, and the like. The content received by the media controllers 12 may be any content desirable for presentation, display or otherwise rendering to a viewer 14, such as broadcast television, movies, video on demand, music, and the like. Units of content will be referred to herein as programs, and a program can refer to any unit of content that is referred to individually by the content provider, such as a particular television show, a particular movie, a song, and the like.

Content is typically, but not necessarily, provided to the media controllers 12 in a content package that is defined by a particular subscription. The subscription between the media controller 12 and the content provider defines which channels and features make up a particular content package, and therefore defines the programming that will be provided by the respective content provider to the media controller 12 pursuant to the subscription. The content providers typically provide an electronic program guide to the media controllers 12 that identifies programs available via the respective content provider. Such guides are depicted in FIG. 1 in the form of respective electronic programming guides 18A-18E (generally, program guides 18 or program guide 18). While for purposes of illustration each media controller 12 is shown as having only a single program guide 18, it will be understood that each media controller 12 may have multiple program guides 18, since each content provider may provide its own respective program guide 18 to the media controller 12.

Program guides 18 typically comprise program metadata identifying attributes and characteristics of programs that were, are, or will be available from the content provider at designated times, or upon request by a viewer 14. The program meta data that makes up a program guide 18 may be provided by a content provider separately from the program content. The program metadata may be continually broadcast by a content provider on a particular channel to which the media controller 12 may automatically tune from time to time to receive the program metadata, may be sent by the content provider upon request by the media controller 12, or may be provided to the media controller 12 at certain predetermined times, such as during low viewership times, or the like. The program metadata can include any data that may be useful or desirable to a viewer 14 (typically as determined by the respective content provider). For example, program metadata may include a title, a description, identification of well-known actors, a channel on which the program will be provided, a genre, an MPAA rating, a duration, a version, a time and date the program will be provided, and the like. Typically, a viewer 14 accesses a program guide 18 via an input device (not illustrated) such as a remote control, wherein, upon receipt of a request via the remote control, the media controller 12 will cause a display of information from the guide 18 on the display device 16. While embodiments described herein may be provided with the aid of a conventional program guide 18, embodiments may also be implemented without a program guide 18. Embodiments may also be provided in conjunction with a merged program guide of the type disclosed in U.S. patent application Ser. No. 12/731,676 entitled "Merged Program Guide", and filed on even date herewith, which is hereby incorporated by reference herein in its entirety.

The media controllers 12A-12E have corresponding tuners 20A-20E (generally tuner 20 or tuners 20), which in response to a channel selection from a viewer 14, tunes to a particular frequency and captures the program data being provided at that frequency. The tuner 20 then typically causes the program to be displayed on a corresponding display device 16, or may record the program on a storage medium (not illustrated) in the corresponding media controller 12. While the tuner 20 has been discussed herein in terms of tuning to a particular frequency, it will be apparent that programs may be differentiated from one another by mechanisms other than a frequency, and that the tuner 20 therefore is not limited to a frequency tuner, but may comprise any suitable tuner capable of selecting a desired program from a plurality of programs. For example, the tuner 20 may access content directly from the Internet via a Uniform Resource Identifier or other identifier.

Each of the media controllers 12A-12E are communicatively coupled to one another via one or more networks 26A, 26B. Some embodiments may be practiced within a locale, such as a residence 22. In such embodiments, the media controllers 12 within the residence 22, in particular the media controllers 12B-12D, may couple to one another via a local area network 26A. The local area network 26A may comprise any suitable communication mechanism that enables the media controllers 12B-12D to communicate with one another, including, for example, an Ethernet network, Token Ring network, and the like. The media controllers 12 access the network 26A via communication links 28, which may comprise any suitable technology for accessing the network 26, such as, for example, Wi-Fi, an Ethernet cable, and the like. The network 26A may use any suitable message transport protocol to enable message communications between the media controllers 12B-12D, such as, for example, TCP/IP.

Other embodiments are practiced in conjunction with media controllers 12 external to the residence 22, such as the media controllers 12A, 12E. All the media controllers 12A-12E may communicate with one another in such embodiments via one or more networks 26A, 26B. The network 26B may comprise, for example, the Internet.

Figure 2:
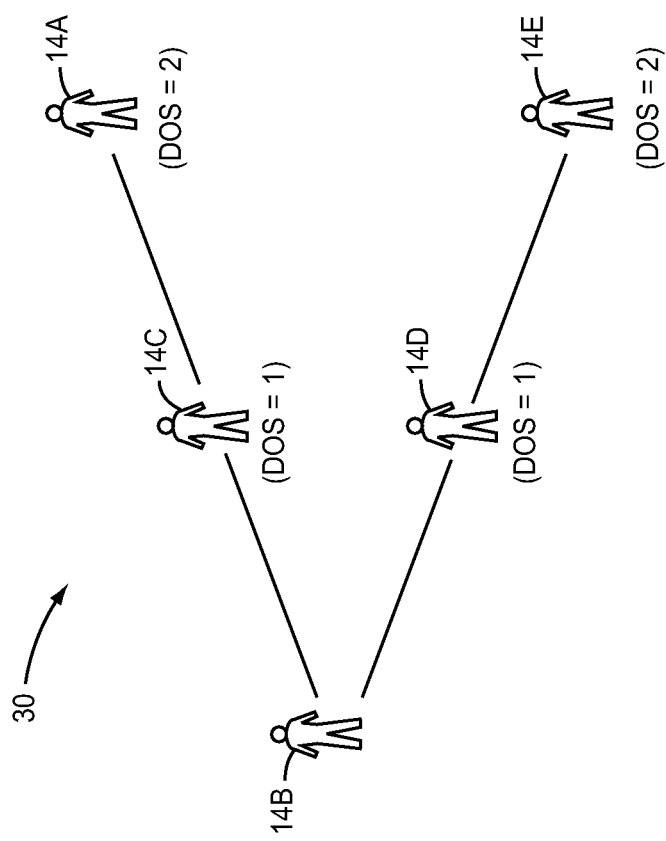
FIG. 2 illustrates an exemplary social relationship diagram of social relationships from the perspective of a particular user.

In some embodiments, the viewers 14A-14E are members of a social network service 24 that, among other features, enable its members to establish social relationships with one another. Members will be referred to hereinafter as users, although the phrase user is not limited to a member of the social network service 24. For example, the social network service 24 may enable a first user to identify a second user as a "friend." Such a social network service 24 may be referred to generally as a friend-of-a-friend (FOAF) social network service 24 wherein its users establish direct relationships with some users, and indirect relationships with other users. FIG. 2 illustrates an exemplary, and simplistic, social relationship diagram 30 of such relationships from the perspective of a particular user, in this example the viewer 14B. Assume that each of the viewers 14A-14E are users of the social network service 24. Thus the social relationship diagram 30 illustrates the FOAF relationship between the viewers 14A-14E from the perspective of the viewer 14B. The social relationship diagram 30 illustrates that the viewer 14B has identified viewers 14C and 14D as friends, but not the viewers 14A or 14E. The viewers 14C and 14D are thus direct friends, and have a direct relationship, with the viewer 14B. The viewers 14C and 14D may also be described as being within one degree of separation (DOS) from the viewer 14B, as depicted by the single path between the viewer 14B and each of the viewers 14C and 14D.

The viewer 14C has identified the viewer 14A as a friend. Thus the viewer 14B has an indirect relationship with the viewer 14A via the viewer 14C. Viewer 14A may also be described as being within two degrees of separation of the viewer 14B, as depicted by the two respective paths between the viewer 14B and the viewer 14A. Similarly, the viewer 14D has identified the viewer 14E as a friend. Thus the viewer 14B has an indirect relationship with the viewer 14E via the viewer 14D, and the viewer 14E may also be described as being within two degrees of separation of the viewer 14B.

Returning now to FIG. 1, the social network service 24 may include one or more social network servers 32 that couple to the network 26B and provide social network services to the viewers 14A-14E. The social network server 32 may be coupled to a storage 34 that contains data, such as, for example, membership data 36 that contains information about each user of the social network service 24, such as billing information, demographic information, user identifier and authentication information, and the like. The storage 34 may also include member preference data 38 that contains preference information of the users, such as likes and dislikes of actors, series, programs, genres, and the like. The preference information may also include priority, or weighting, information that will be discussed more fully herein, wherein a user may attribute different category weights to different friends based on the user's interactions with such friends. For example, a user who highly values a first friend's opinion on programs may accord a program rating weight of 10 to the first friend, and accord a program rating weight of 1 to a second friend whose opinions are not highly valued by the user. The member preference data 38 may store such information, and other information, in a user profile corresponding to each user of the social network service 24.

The storage 34 may also include program rating data 40 derived from the users of the social network service 24. The program rating data 40 may be used, as discussed in greater detail herein, to socially rank programs for a viewer 14. In one embodiment, program representations having differentiating visual characteristics that correspond to a relative social rank of the program may be presented to a viewer 14 to visually enable a viewer 14 to easily see which programs are socially significant to the viewer 14.

The program rating data 40 may include implicit rating data and explicit rating data. Implicit rating data may include data that identifies a program that a particular user is currently, or has previously, accessed. Accessing may include, for example, viewing, or listening, to the program, or recording the program for later enjoyment. Assume, for example, that each of the viewers 14A-14E are members of the social network service 24. As each viewer 14 begins to access a program, such as by directing the media controller 12 to tune to a program, or to record a program, the corresponding media controller 12 may send a message to the social network server 32 identifying the program, and related information such as the identity of the viewer 14, a link to program metadata associated with the program, and the like. The social network server 32 may store such information in the program rating data 40.

The program rating data may also, or alternatively, include explicit rating data. Explicit rating data may be provided by the viewers 14 via corresponding media controllers 12, or via other devices, such as computers, cell phones, and the like. The explicit rating data may include subjective ratings of programs by the respective viewers 14. For example, each of the viewers may provide a rating value ranging from 1-10 after viewing a particular program that is provided to the social network server 32 and maintained in the program rating data 40.

The storage 34 may also include friend-of-a-friend (FOAF) relationship data 42 which identifies the degrees of separation between the users of the social network service 24. The FOAF relationship data 42 may relatively easily enable the social network server 32 to relatively quickly identify the users of the social network service 24 that are within a designated DOS of another user.

While the social network server 32 and storage 34 are illustrated as being external to the residence 22, other embodiments may be implemented solely within a residence 22. In such embodiment, the social network server 32 and storage 34 may simply be coupled to the network 26A, and contain similar information as described herein but for a smaller population of users, such as immediate family members and direct and indirect friends up to a desired DOS. Additionally, one or more components, functionality or data identified herein as associated with the social network server 32 may be provided by one or more other sources that may be communicatively coupled to the social network server 32, via, for example, the Internet. For example, the FOAF relationship data 42 may be provided by another social network service, such as Facebook®. Similarly, the program rating data 40 could be provided by a service provider, such as Time Warner Cable.

Various mechanisms may be used to associate program rating information contained in the program rating data 40 with a particular user. In one embodiment, the user may simply be assumed to be the registered user of a particular media controller 12 that provided the rating data. For example, a media controller 12 may be registered, or otherwise identified to the social network service 24 as being associated with the user John. Thus, any rating data provided to the social network server 32 by such media controller 12, either implicit or explicit, may be determined by the social network server 32 to be associated with the user John. In other embodiments, the media controller 12 may be able to identify a particular viewer 14 that is in proximity to the media controller 12. This information may be provided, along with the rating data, to the social network server 32.

Figure 3:
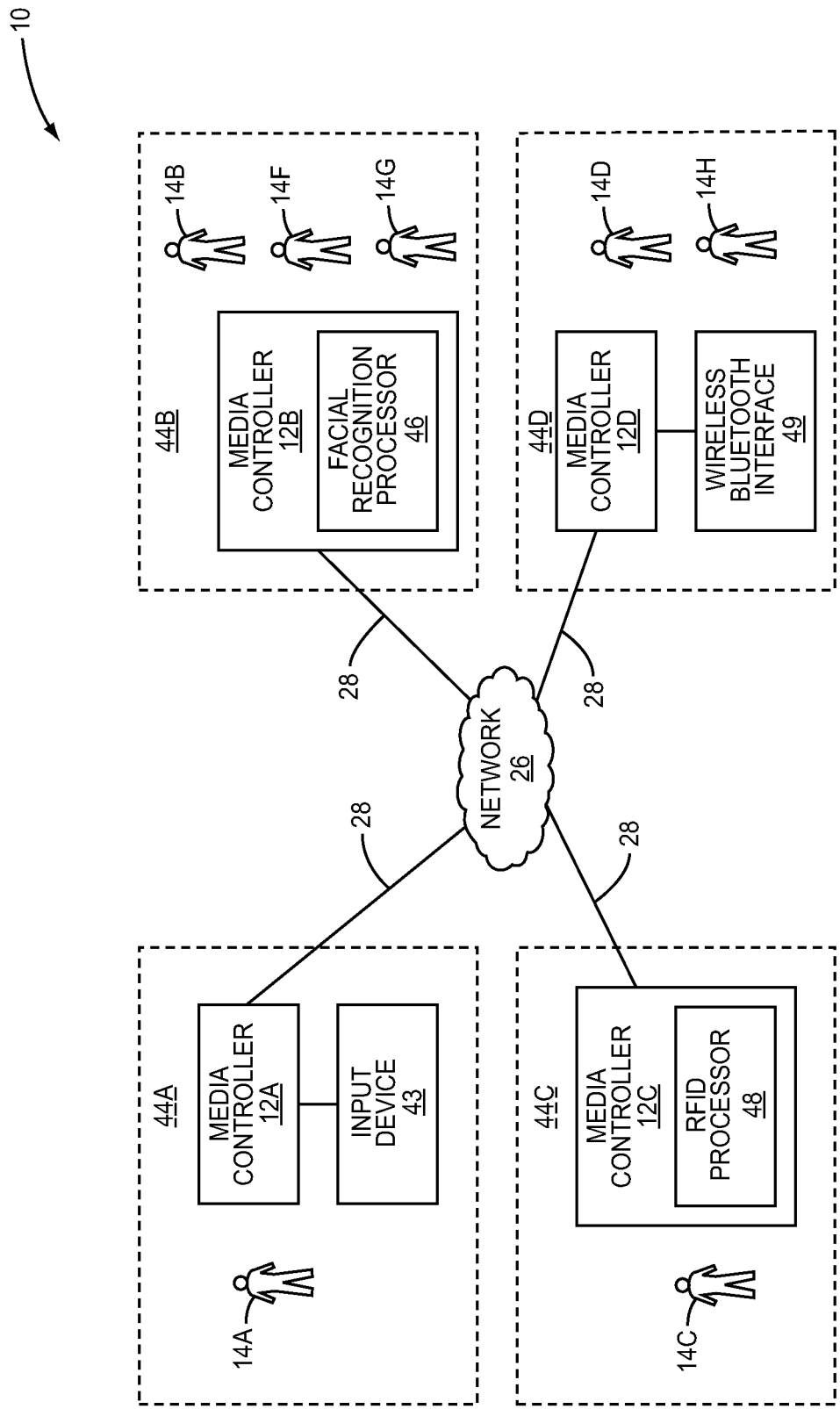
FIG. 3 is a block diagram illustrating four exemplary mechanisms that may be used by a media controller to determine the identity of a particular viewer.

FIG. 3 is a block diagram illustrating four exemplary mechanisms that may be used by a media controller 12 to determine the identity of a particular viewer. The media controller 12A may be communicatively coupled to an input device 43. As the viewer 14A enters the room 44A, the viewer 14A uses the input device 43 to indicate that the respective viewer 14A is in the room 44A and accessing a program via the media controller 12A. Prior to exiting the room 44A, the viewer 14A may use the input device 43 to indicate they are departing the room 44A. While only a single viewer 14A is illustrated, it is apparent that any number of viewers 14 may be identified in this manner, and if such viewers 14 are also users of the social network service 24, identified to the social network server 32 as accessing a particular program. Thus, the social network server 32 may be able to determine that multiple users are viewing or otherwise accessing the same content in a same locale. The media controller 12A may maintain the identity of the viewers 14 who are in the room 44A, and for each program provided during the presence of such viewers 14, identify this to the social network server 32. The input device 43 may comprise any suitable device and interface, such as a keyboard, or a mouse and a computer having a user interface that enables a viewer 14 to simply click on a designated portion of a display to indicate the presence or departure of the viewer 14 from the room 44A. The computer may be wirelessly coupled to the media controller 12A, and communicate the status of incoming and outgoing viewers 14 to the media controller 12 as appropriate.

The media controller 12B in the room 44B includes a facial recognition processor 46 that is able to identify through facial processing technology the viewers 14B, 14F and 14G. Assume that each of the viewers 14B, 14F and 14G is a user of the social network service 24. Facial recognition technology is known to those skilled in the art, and will not be described in detail herein. The facial recognition processor 46 communicates the identity of the viewers 14B, 14F and 14G to the media controller 12B, which in turn may provide this information to the social network server 32 as appropriate. While the facial recognition processor 46 is illustrated as being integral with the media controller 12B, in an alternate embodiment, the facial recognition processor 46 may be separate from but coupled to media controller 12B via a wired or wireless communications channel, for example.

The media controller 12C in a room 44C includes a radio frequency identification (RFID) processor 48. The RFID processor 48 may receive a signal from a device worn, or carried, by the viewer 14C. For example, a cell phone of the viewer 14C may emit a signal that can be received by the RFID processor 48. Upon receipt of such signal, the RFID processor 48 can communicate the identity of the viewer 14C to the media controller 12C, which in turn may provide this information to the social network server 32 as appropriate.

The media controller 12D in a room 44D is coupled to a wireless Bluetooth interface which enables the media controller 12D to communicate with Bluetooth devices, such as a cell phone, that contain the appropriate software to interface with the media controller 12D. Such software may be programmed to emit a signal that can be detected by the media controller 12D via the wireless Bluetooth interface 49. The signal may contain an identifier identifying the viewers 14D and 14H. The media controller 12D may periodically poll the cell phone to determine if the viewers 14D, 14H are still in proximity of the media controller 12D. If the media controller 12D does not receive a response to the poll, the media controller 12D may determine that one or both of the viewers 14D, 14H are no longer in proximity of the media controller 12D.

Figure 4:
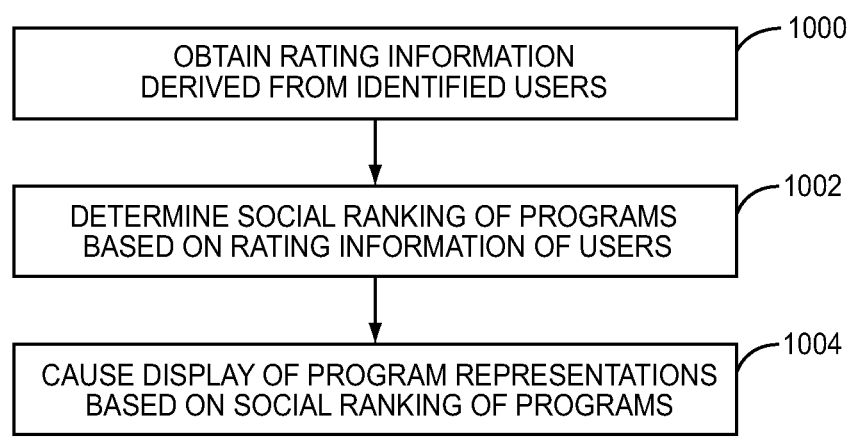
FIG. 4 is an exemplary flowchart of a method for causing a display of program representations according to one embodiment.

FIG. 4 is an exemplary flowchart of a method for causing a display of program representations according to one embodiment. Upon request from a viewer 14, the media controller 12 may obtain from the social network server 32 program rating information that is derived from identified users (step 1000). The media controller 12 then determines a social ranking based on the program rating information (step 1002). The media controller 12 then causes a display of program representations having differentiating visual characteristics that are based on the social ranking of the corresponding programs (step 1004).

Figure 5:
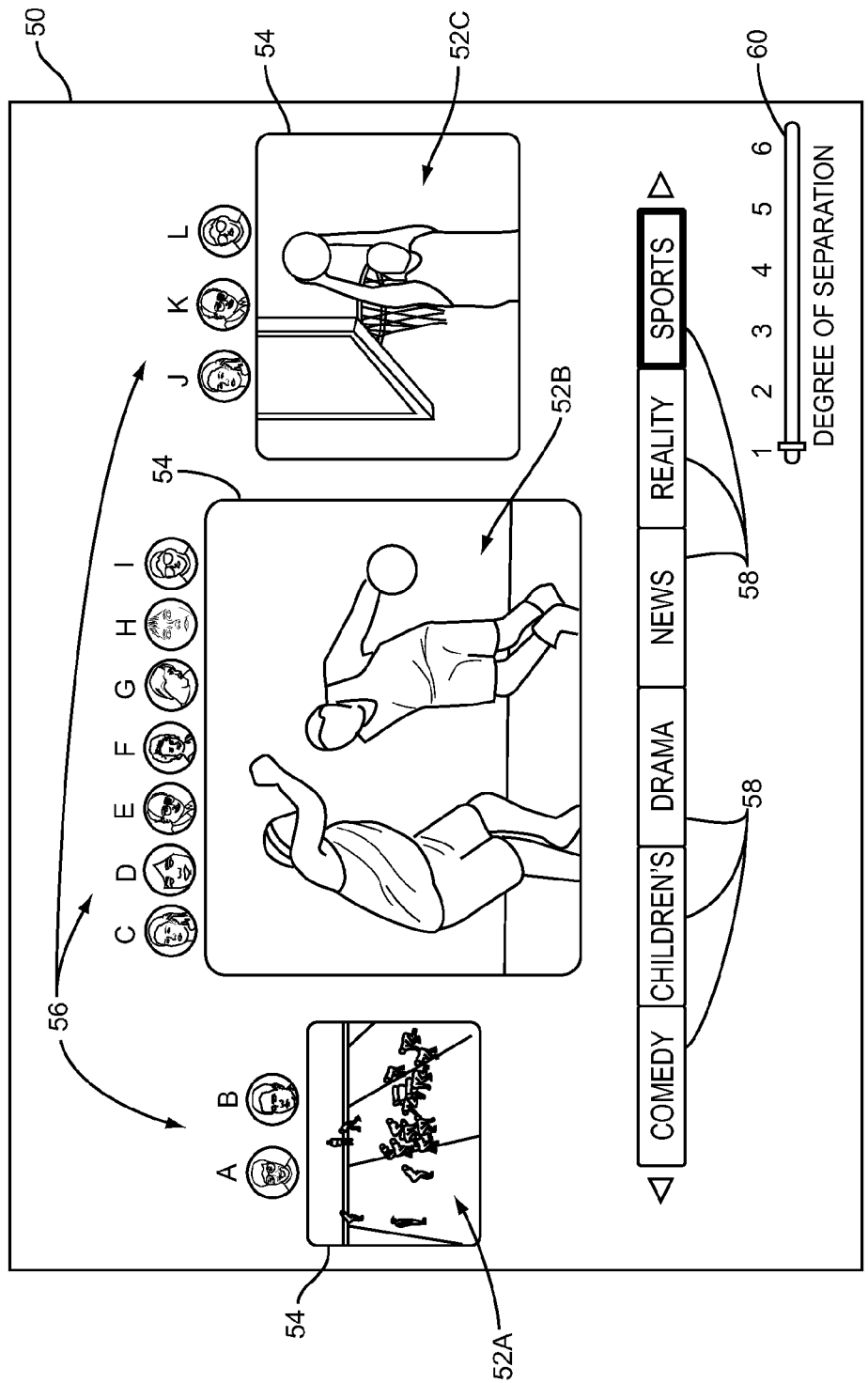
FIG. 5 illustrates an exemplary display caused by a media controller of program representations based on a social ranking of corresponding programs.

FIG. 5 illustrates an exemplary display 50 caused by a media controller 12 of program representations 52A-52C (generally program representations 52 or program representation 52) based on a social ranking of corresponding programs. Each of the program representations 52A-52C have a differentiating visual characteristic from one another, in this example a particular size, and corresponds to a particular program that may be currently available for presentation to a viewer 14 via the media controller 12. In one embodiment, the size of each program representation 52 is based on a social rank of the program with respect to the social rank of the other programs with respect to a particular viewer 14. Programs having a higher social rank may have a larger program representation than those programs having a lower social rank. For example, the program representation 52A corresponds to a program that has been determined to have a lower social rank, and thus lower social importance or significance with respect to the particular viewer 14 than the program that corresponds to the program representation 52C. Similarly, the program representation 52C corresponds to a program that has been determined to have a lower social rank, and thus lower social importance or significance with respect to the particular viewer 14 than the program that corresponds to the program representation 52B. Consequently, the program representation 52B corresponds to the program having the greatest social rank, or significance, with respect to the viewer 14.

While for purposes of illustration, a size of a program representation is used as a differentiating visual characteristic, embodiments are not limited to any particular differentiating visual characteristics. For example, each program representation may have a background color, or a border color, based on the social rank of the corresponding program. For example, the program representation corresponding to the highest ranked program may have a green background or border, the program representation corresponding to the next highest ranked program may have a yellow background or border, and the program representation corresponding to the third highest ranked program may have a red background or border. Thus, while exemplary differentiating visual characteristics are presented herein, any suitable differentiating visual characteristics may be used to differentiate program representations from one another based on the corresponding social ranking.

The program representations 52 may also include a border 54, within which the corresponding program is identified. The program may be identified by name, visual imagery, or the like. In one embodiment, the program may be presented within the border 54. User icons 56 may identify particular users of the social network service 24 who are the bases of the implicit ratings. For example, the user icons 56A and 56B identify corresponding users that have accessed or are accessing the program corresponding to the program representation 52A. User icons 56C-56I identify corresponding users that have or are accessing the program corresponding to the program representation 52B. Similarly user icons 56J-56L identify corresponding users that have accessed or are accessing the program corresponding to the program representation 52C. The user icons 56 may comprise text, imagery corresponding to a particular user such as an avatar or a picture, or a combination of both. The use of user icons 56 in conjunction with the program representations 52 visually inform a viewer 14 not only which programs are more socially significant than others, but also which particular friends may be accessing which particular programs.

Genre selection buttons 58 may be used by the viewer 14 to limit the program representations 52 to a particular genre of program. For example, the "Drama" genre selection button 58 may be selected to determine which programs of genre type Drama are most socially significant to the viewer 14. A degree of separation (DOS) slider 60 may be used to select a threshold DOS value that is used by the social network server 32 to identify users. For example, if the DOS slider 60 is set to a value of 1, only the ratings of the direct friends of the viewer 14 are taken into consideration. If the DOS slider 60 is set to a value of 2, the social ranking includes data from users that have a direct relationship with the viewer 14, e.g., users that are designated as friends of the viewer 14, and from users that have an indirect relationship with the viewer 14, e.g., users that are friends of the friends of the viewer 14.

Figure 6:
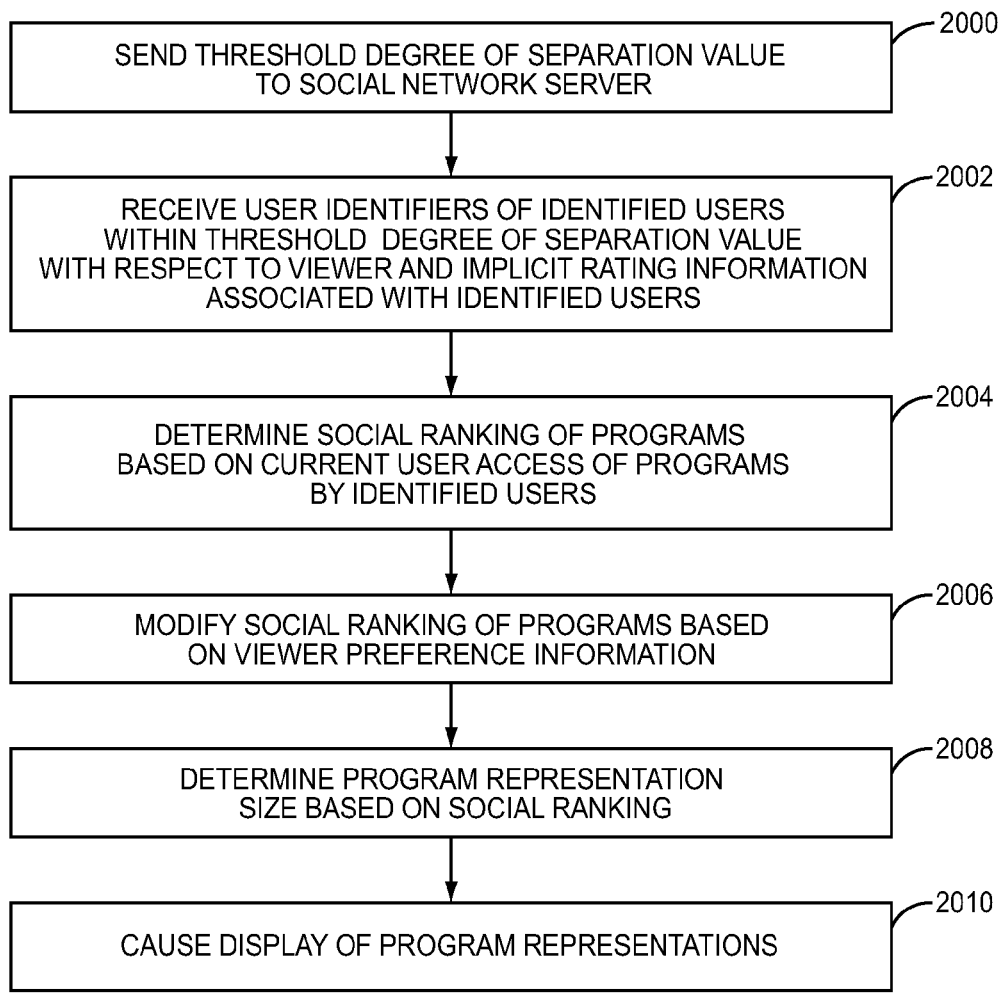
FIG. 6 is a flowchart illustrating an exemplary process for determining a social ranking of a plurality of programs according to one embodiment wherein social ranking is based on implicit ratings of users of the social network service with whom the viewer has a direct or indirect relationship.

FIG. 6 is a flowchart illustrating an exemplary process for determining a social ranking of a plurality of programs according to one embodiment wherein social ranking is based on implicit ratings of users of the social network service 24 with whom the viewer has a direct or indirect relationship. FIG. 6 will be discussed in conjunction with FIGS. 5 and 1. Assume that the viewer 14B desires a social ranking of one or more programs that are currently available for viewing via the media controller 12B. The viewer 14B may use an input device, such as a remote control, to cause the display of a program guide by the media controller 12B on the display device 16B. The program guide may include a Social Significance tab, or other such feature, that enables the media controller 12B to interact with the social network server 32 to determine the social rankings of programs. Assume further that the viewer 14B selects such feature, and sets the DOS slider 60 to a value of 2.

The media controller 12B uses the value of the DOS slider 60 to generate a message that includes data including the threshold DOS value of 2, the identity of the viewer 14B, and any other suitable data, such as the genre selected via a genre button 58. The media controller 12B sends the message to the social network server 32 (step 2000). The social network server 32 accesses the program rating data 40 to determine the implicit rating data of users of the social network service 24. The social network server 32 also accesses the FOAF relationship data 42 to identity those users that are within two degrees of separation from the viewer 14B. The social network server 32 provides data identifying the users that are within two DOS of the viewer 14B, and corresponding implicit rating data identifying the programs the identified users have implicitly rated, to the media controller 12B (step 2002).

The media controller 12B determines a social ranking of programs based on the implicit rating data (step 2004). Any suitable process for socially ranking the programs based on the implicit rating data may be used. For example, the media controller 12B may identify the four programs that have higher implicit ratings than any other programs. For each of those programs, such programs may be ranked based on the number of users that implicitly rated such programs. For example, assume the implicit rating data indicates that a first program is implicitly rated by 12 users, a second program is implicitly rated by six users, a third program is implicitly rated by four users, and a fourth program is implicitly rated by two users. The media controller 12B determines the social ranking, in order of importance, to be: first program, second program, third program and fourth program.

In one embodiment, the viewer 14 may have member preference data 38 that identifies priorities, or weights, that the viewer 14 has accorded to one or more identified users. For example, the viewer 14 may accord one of the identified users a 10 on a scale of 1 to 10 because the viewer 14 highly values that user's opinion, and may have accorded another identified user a 4 because the viewer 14 does not value that user's opinion very highly. This information may be stored on the social network server 32 and provided along with the program rating information to the media controller 12, or may be stored locally on the network 26A, such as on a local server (not illustrated), or in the media controller 12B. The media controller 12B may in such embodiment apply a weighted average to the ratings based on the weights accorded to each such identified user (step 2006). Thus, the social ranking may be based not only on the implicit ratings of a program, but also on the weighted average of one or more other factors identified by the viewer 14.

The media controller 12B may then determine the size of the program representations of the corresponding programs in order to accurately convey the determined social significance (step 2008). For example, assuming the social rating is not based on a weighted average, the media controller 12B may first determine an overall area size in which all program representations must be displayed. Using such information, the media controller 12B may then determine an appropriate program representation area size for program representation corresponding to the first program. The media controller 12B may then, for example, scale the size of the remaining program representations with respect to the size of the first program representation. For example, the size of the second program representation may be ½ (i.e., 6 of 12) of the size of the first program representation, the size of the third program representation may be ⅓ (i.e., 4 of 12) of the size of the first program representation, and the size of the fourth program representation may be ⅙ (i.e., 2 of 12) of the size of the first program representation.

The media controller 12B may then cause a display of the program representations, similar to the display 50 illustrated in FIG. 5, however with four program representations rather than three (step 2010).

Figure 7:
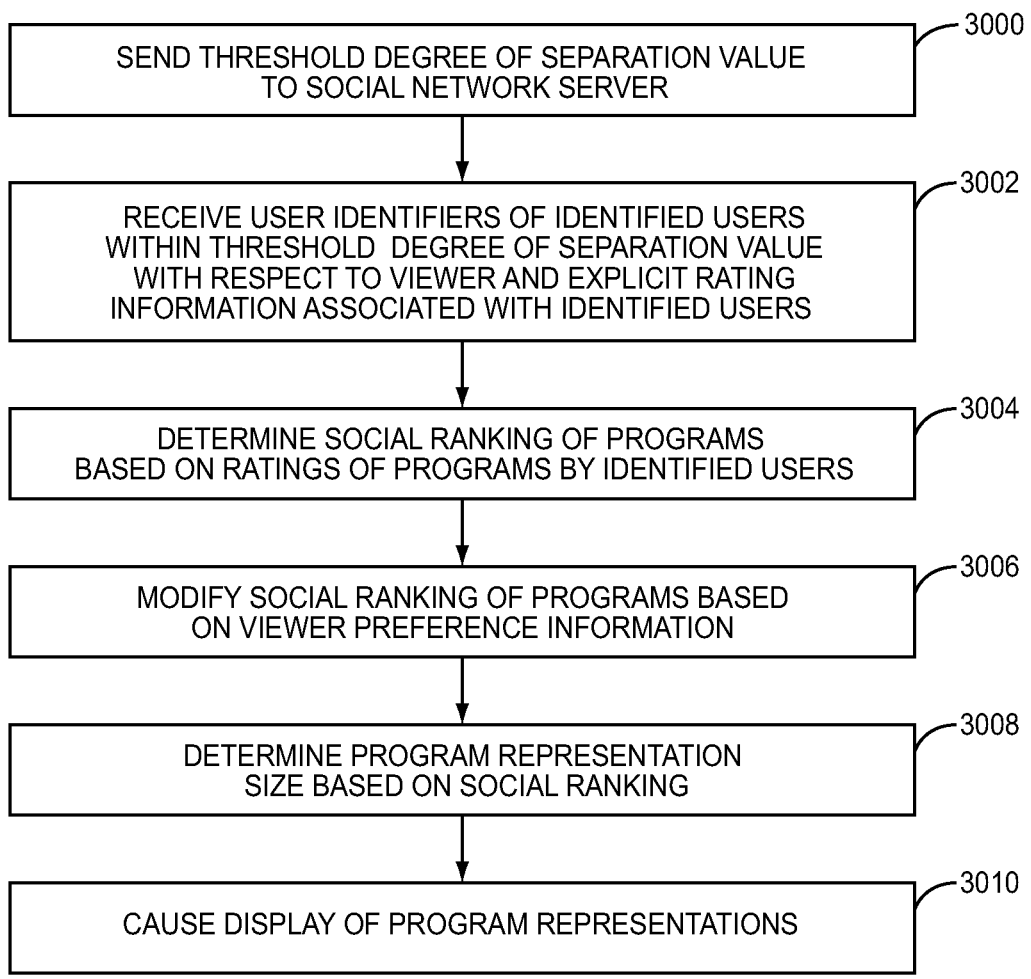
FIG. 7 is a flow chart illustrating an exemplary process for determining a social ranking of a plurality of programs according to one embodiment wherein social ranking is based on explicit ratings of users of the social network service with whom the viewer has a direct or indirect relationship.

FIG. 7 is a flow chart illustrating an exemplary process for determining a social ranking of a plurality of programs according to one embodiment wherein social ranking is based on explicit ratings of users of the social network service 24 with whom the viewer has a direct or indirect relationship. The same assumptions regarding viewer 14B and the media controller 12B made with respect to FIG. 6 will be made with respect to FIG. 7. The media controller 12B uses the value of the DOS slider 60 to generate a message that includes data such as the threshold DOS value of 2, and the identity of the viewer 14B. The media controller 12B sends the message to the social network server 32 (step 3000). The social network server 32 accesses the program rating data 40 to determine explicit ratings of programs that are currently available. The social network server 32 also accesses the FOAF relationship data 42 to identify those users that are within two degrees of separation from the viewer 14B. In this embodiment, because the rating data is explicit rating data, the media controller 12B may also send a list of programs for which a social ranking is desired. For example, the media controller 12B may, from user preferences or past viewing history of the viewer 14B, be able to select a plurality of programs that the viewer 14B is likely to view, and identify such programs to the social network server 32.

The social network server 32 provides data identifying the users that are within two DOS of the viewer 14B, and corresponding explicit rating data identifying subjective ratings of programs by the identified viewers, to the media controller 12B (step 3002). The media controller 12B determines a social ranking of programs based on the explicit rating data (step 3004). Any suitable process for determining which programs are more socially significant based on the explicit rating data may be used, including that discussed herein with regard to FIG. 6, which will not be repeated herein. For example, in one embodiment, the media controller 12B may simply select a predetermined number of the highest rated programs, and socially rank the programs from greatest to least based on the average explicit ratings of such programs. Similarly as discussed with regard to FIG. 6, the media controller may also take into consideration weighted averages of users based on preferences identified by the viewer 14B (step 3006). Assume that after processing the explicit ratings, and weighting users' ratings appropriately, the four programs having the highest weighted average ratings have ratings of 10.0, 9.8, 9.6 and 9.2, respectively.

The media controller 12B may then determine the size of the program representations of the corresponding programs in order to convey the determined social significance (step 3008). The media controller 12B may first determine an overall area size in which all program representations must be displayed. Because of the relatively small difference in explicit ratings of the four programs, the media controller 12B may scale the differences to highlight which programs are more socially relevant than others of the programs. For example, the media controller 12B may treat each ⅒ difference in rating as a ⅒ difference in program representation size. Thus, the program representation corresponding to the second highest rated program will be ⅘ the size of the program representation corresponding to the highest rated program, the program representation corresponding to the third highest rated program will be ⅗ the size of the program representation corresponding to the highest rated program, and the program representation corresponding to the fourth highest rated program will be ⅕ the size of the program representation corresponding to the highest rated program. It should be apparent such scaling is merely exemplary, and any suitable process may be implemented to select a program representation size based on the social rankings.

The media controller 12B may then cause a display of the program representations, similar to the display 50 illustrated in FIG. 5, however with four program representations rather than three (step 3010). The user icons 56 may identify particular users with particular program representations 52 who have highly rated the corresponding program.

Figure 8:
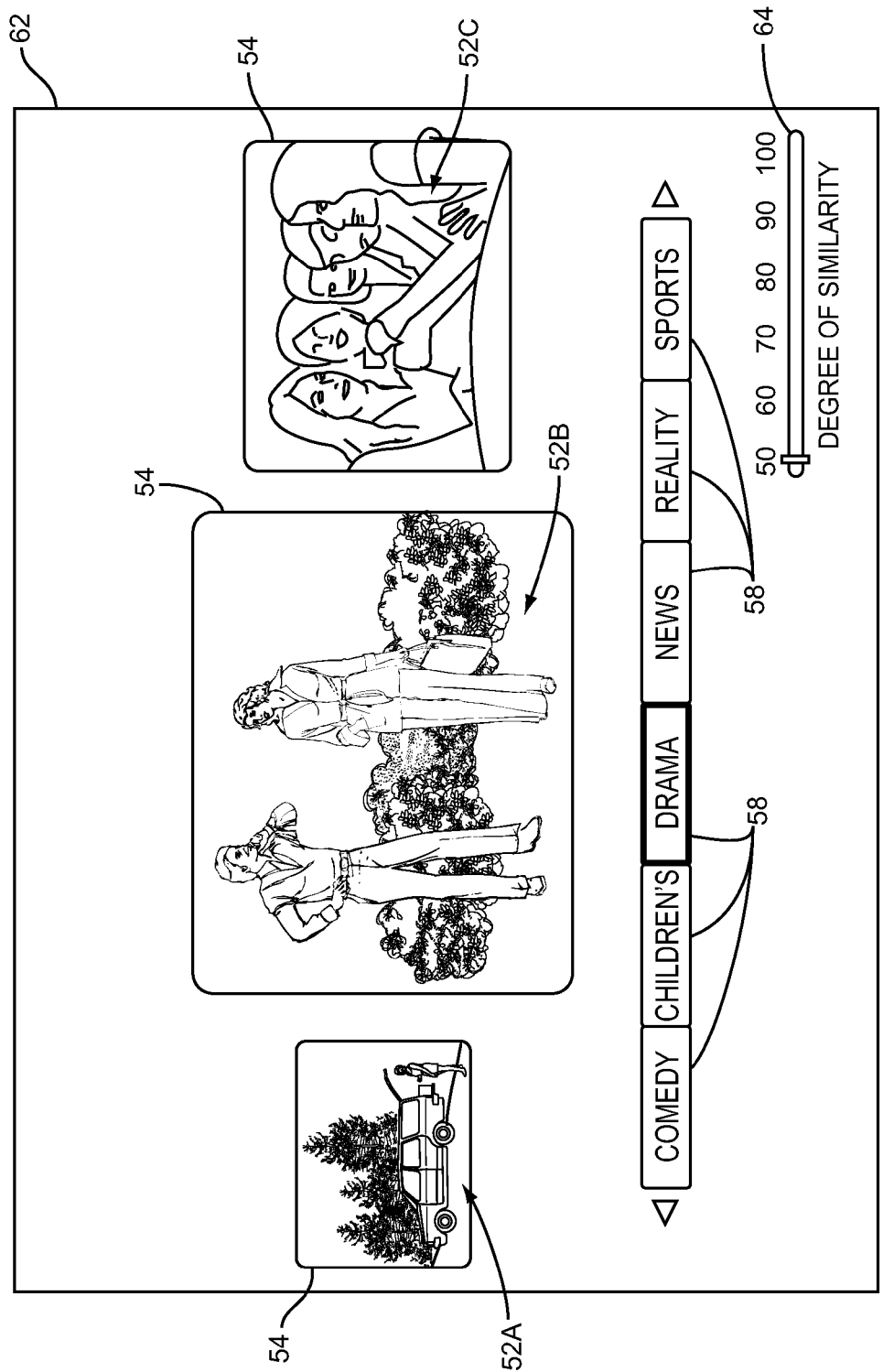
FIG. 8 illustrates another exemplary display caused by a media controller of program representations based on a social ranking of corresponding programs.

FIG. 8 illustrates another exemplary display 62 caused by a media controller 12 of program representations 52A-52C based on a social ranking of corresponding programs. In this embodiment, however, the social ranking is based on rating data that may include users of the social network service 24 that have no direct or indirect relationship with the viewer 14. In this embodiment, the program representations 52 and genre selection buttons 58 may be similar to those depicted in FIG. 5, however the viewer icons 56 may be absent because the social ranking may include anonymous user ratings in addition to, or in lieu of, ratings of users with whom the viewer 14B has a direct or indirect relationship. The display 62 includes a similarity slider 64 that allows the viewer 14B to indicate a threshold degree of similarity value that should be considered in selecting the population of identified users. As will be discussed herein with respect to FIG. 9, the similarity between the viewer 14B and the identified users may be determined, for example, by comparing the profile of the viewer 14B with the profiles of other users of the social network service 24. The similarity slider 64 may indicate the threshold degree of similarity value necessary during such profile comparison process to constitute a match. Thus, if the similarity slider 64 is set to a high percentage, such as 100, the viewer 14B has indicated that only users who have identical, or nearly identical profiles, be considered a match. If the similarity slider 64 is set to a relatively low percentage, such as 50, the viewer 14B has indicated that users whose profiles constitute as low as a 50% match of profile attributes or characteristics should be considered a match.

Figure 9:
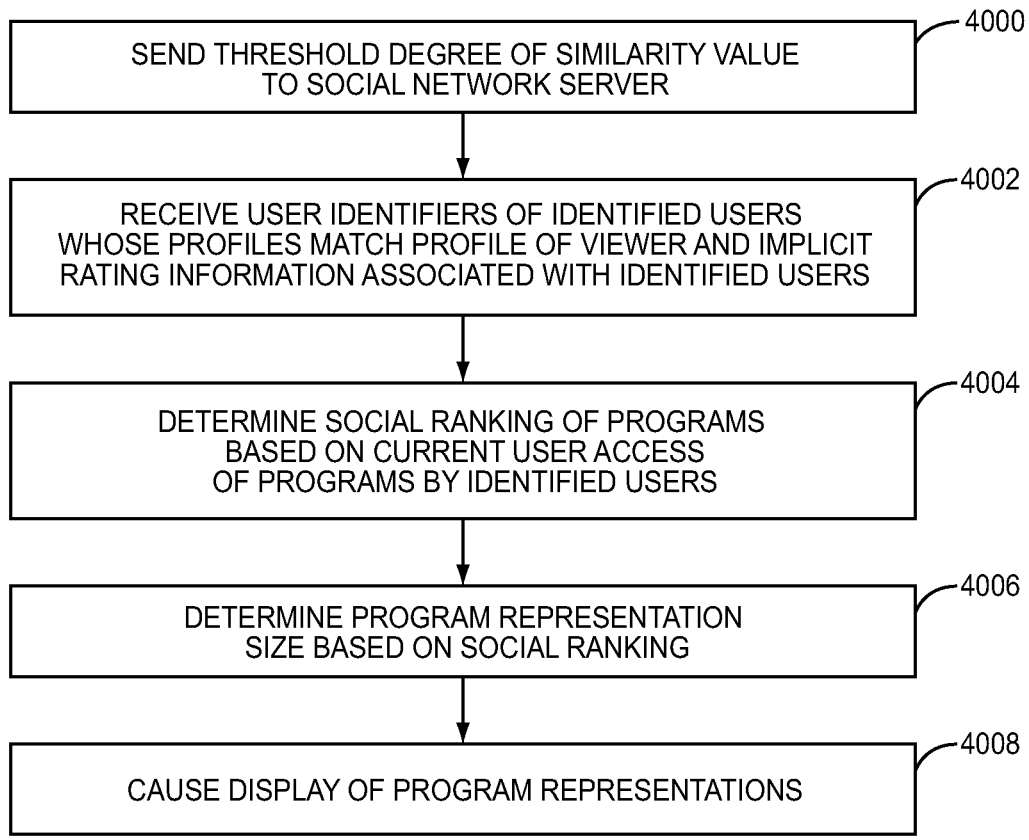
FIG. 9 is a flowchart illustrating an exemplary process for determining a social ranking of a plurality of programs according to one embodiment wherein social ranking is based on implicit ratings of users of the social network service with whom the viewer's profile has been matched based on a threshold degree of similarity value.

FIG. 9 is a flowchart illustrating an exemplary process for determining a social ranking of a plurality of programs according to one embodiment wherein social ranking is based on implicit ratings of users of the social network service 24 with whom the viewer's profile has been matched based on a desired similarity factor. FIG. 9 will be discussed in conjunction with FIGS. 8 and 1. Assume that the viewer 14B desires a social ranking of one or more programs that are currently available for viewing via the media controller 12B. The viewer 14B may use an input device, such as a remote control, to cause the display of a program guide by the media controller 12B on the display device 16B. The program guide may include a Social Significance tab, or other such feature, that enables the media controller 12B to interact with the social network server 32 to determine the social rankings of program. Assume further that the viewer 14B selects such feature, and sets the similarity slider 64 to a value of 90%.

The media controller 12B uses the value of the similarity slider 64 to generate a message that includes data such as the desired threshold degree of similarity value, and the identity of the viewer 14B. The media controller 12B sends the message to the social network server 32 (step 4000). The social network server 32 accesses the program rating data 40 to determine which users of the social network service 24 have provided implicit ratings. The social network server 32 also performs a profile comparison of the viewer's 14B profile with the profiles of other users of the social network service 24. Profile matching can include matching of one or more preferences identified in the profiles being compared. For example, profile matching may compare likes and dislikes of actors, series, genres, and the like, and using any desired algorithm determine a similarity between the profile of the viewer 14B and the profile of another user of the social network service 24.

The social network server 32 may stop comparing profiles after a predetermined number of users have been identified, or may compare profiles of all the users of the social network service 24. In one embodiment, the social network server 32 includes one or more background processes that execute continually comparing profiles of users with other users, and identifying matching users at different threshold degrees of similarity values, such that the majority of the profile matching processing may have already occurred prior to receiving the message from the media controller 12B.

The social network server 32 provides data identifying the users whose profiles match the profile of the viewer 14B within the desired threshold degree of similarity value, and corresponding implicit rating data identifying the programs implicitly rated by the identified users, to the media controller 12B (step 4002). Alternately, the users may not be individually identified for privacy purposes, or due to the number of users whose profiles matched the profile of the viewer 14B.

The media controller 12B determines a social ranking of programs based on the implicit rating data (step 4004). Any suitable process for determining which programs are more socially significant based on the implicit rating data may be used. For example, the media controller 12B may identify the four programs that are implicitly rated by more identified users than any other programs. For each of those programs, such programs may be ranked based on the number of users who have provided implicit ratings of such programs. For example, assume the implicit rating data indicates that a first program is implicitly rated by 12 users, a second program is implicitly rated by six users, a third program is implicitly rated by four users, and a fourth program is implicitly rated by two users. The media controller 12B determines the social ranking, in order of importance, to be: first program, second program, third program and fourth program.

The media controller 12B may then determine the size of the program representations of the corresponding programs in order to accurately convey the determined social significance (step 4006). This may be done similarly as that described with regard to FIG. 6. For example, the media controller 12B may first determine an overall area size in which all program representations must be displayed. The media controller 12B may then determine an appropriate size of the program representation corresponding to the first program. Using a scaling factor, the media controller 12B may then determine that the program representation corresponding to the second program should be scaled at a factor of ½ (6 of 12), the third program representation at a factor of ⅓ (4 of 12), and the fourth program representation at a factor of ⅙ (2 of 12).

The media controller 12B may then cause a display of the program representations, similar to the display 62 illustrated in FIG. 8, however with four program representations rather than three (step 4008).

Figure 10:
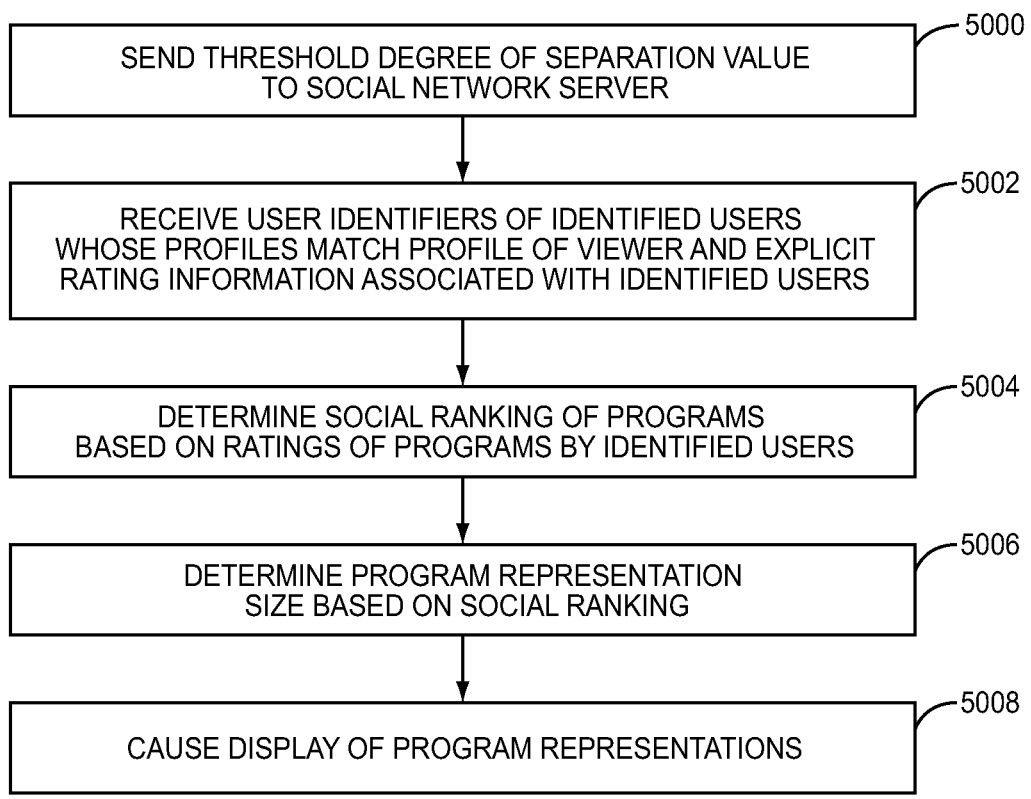
FIG. 10 is a flow chart illustrating an exemplary process for determining a social ranking of a plurality of programs according to one embodiment wherein social ranking is based on explicit ratings of users of the social network service with whom the viewer's profile has been matched based on a desired similarity factor.

FIG. 10 is a flow chart illustrating an exemplary process for determining a social ranking of a plurality of programs according to one embodiment wherein social ranking is based on explicit ratings of users of the social network service 24 with whom the viewer's profile has been matched based on a designated threshold degree of similarity value. FIG. 10 will be discussed in conjunction with FIGS. 8 and 1. The same assumptions regarding viewer 14B and the media controller 12B made with respect to FIG. 9 will be made with respect to FIG. 10. The media controller 12B uses the threshold degree of similarity value identified by the similarity slider 64 to generate a message that includes data such as the desired threshold degree of similarity value, and the identity of the viewer 14B. The media controller 12B sends the message to the social network server 32 (step 5000). The social network server 32 accesses the program rating data 40 to determine explicit ratings of programs that are currently available. The social network server 32 also performs a profile comparison of the viewer's 14B profile with the profiles of other users of the social network service 24. The profile matching process was described herein with respect to FIG. 9 and will not be repeated herein. The social network server 32 provides data identifying the users whose profiles match the profile of the viewer 14B within the desired threshold degree of similarity value, and corresponding explicit rating data identifying subjective ratings of programs by the identified viewers, to the media controller 12B (step 5002). Alternately, the identified users may not be individually identified to the media controller 12B for privacy purposes, or due to the number of identified users whose profiles matched the profile of the viewer 14B.

The media controller 12B determines a social ranking of programs based on the explicit rating data (step 5004). Any suitable process for determining which programs are more socially significant based on the explicit rating data may be used, including those discussed herein with regard to FIG. 7, which will not be repeated herein. The media controller 12B may then determine a program representation size of the highest socially ranked programs, such as, for example, in the manner discussed herein with regard to step 3008 of FIG. 7 (step 5006). The media controller 12B may then cause a display of the program representations, similar to the display 62 illustrated in FIG. 8, however with four program representations rather than three (step 5008).

Figure 11:
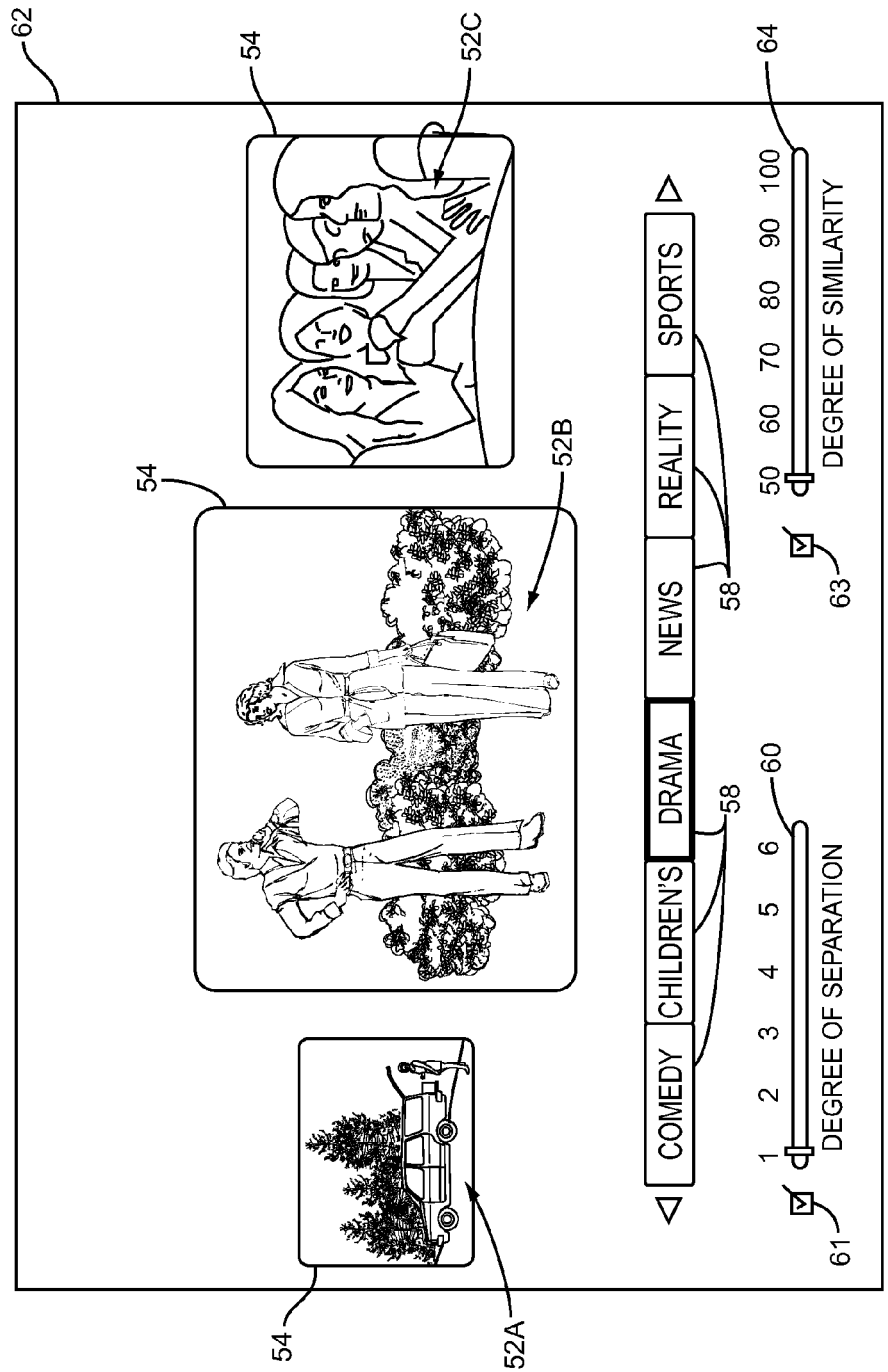
FIG. 11 illustrates another exemplary display caused by a media controller of program representations based on a social ranking of corresponding programs.

FIG. 11 illustrates another exemplary display caused by a media controller 12 of program representations 52 based on a social ranking of corresponding programs. While for purposes of illustration, previous embodiments have been discussed as using implicit ratings or explicit ratings, programs may be socially ranked by any combination of the various factors, including implicit ratings, explicit ratings, degree of separation and degree of similarity. FIG. 11 illustrates an exemplary display 62 which includes both the DOS slider 60 and the similarity slider 64. The DOS slider 60 has an accompanying DOS option box 61 which enables the viewer 14 to indicate whether the viewer 14 would like a threshold DOS value to be taken into consideration when identifying users. The similarity slider 64 has an accompanying similarity option box 63 which enables the viewer 14 to indicate whether the viewer 14 would like a threshold degree of similarity value to be taken into consideration when identifying users. Thus, in response to the selections depicted on FIG. 11, the media controller 12 may send a message to the social network server 32 that contains both a viewer selected threshold DOS value of one, and a viewer selected threshold degree of similarity value of 50. In response, the social network server 32 identifies a group of users who are one DOS from the viewer 14, and a group of users who have profiles that constitute at least a 50% similarity match to the profile of the viewer 14.

In another embodiment, users may be identified based on a combination of the threshold degree of similarity value and the threshold DOS value. For example, the social network server 32 may first identify users that are within a designated DOS of the viewer 14, and further filter those users based on a profile similarity of such users with respect to the viewer 14. Alternately the initial group of users may be identified based on a profile similarity match, who then may be further filtered based on the threshold DOS value. This option may be selectable by the viewer 14 and provided to the social network server 32 as appropriate.

The social rankings may be based on the combination of these four factors, including implicit ratings, explicit ratings, users identified by degree of separation, and users identified by similarity of profiles. Each factor could be weighted differently, wherein the social ranking of the program is based on a weighted average of each factor. The weights provided to each such factor could be system configurable, or could be user configurable. In one embodiment, the weights could be viewer alterable, similar to the DOS slider 60. For example, the viewer 14 may indicate the weight of the implicit ratings should be 70% of the total social ranking, and the weight of explicit ratings should be 30% of the total social ranking. Additional weights could be attributed to the source of the ratings, wherein users identified via a DOS relationship with the viewer 14 should be given an 80% weight, and those identified by a degree of similarity should be given a 20% weight. It will be appreciated that these are merely exemplary, and any number of potential weightings are possible in deriving the social ranking of the programs.

While for purposes of illustration implicit ratings and explicit ratings have been discussed in terms of actual programs that were implicitly or explicitly rated, in other embodiments, implicit ratings and explicit ratings may include ratings of previous episodes of the same programs. For example, for a new episode of a series, no program rating information may exist. Thus, the social network server 32 may take into consideration program rating information of previous episodes of the series.

In yet another embodiment, implicit ratings and explicit ratings may include program rating information of programs that are similar to the programs being socially ranked. For example, assume that based on a number of criteria, such as genre, type of program, and the like, two programs are deemed to be similar to one another. For example, assume that the program The Bachelor is deemed to be similar to The Bachelorette. In one embodiment, The Bachelorette may be available for viewing, but insufficient implicit or explicit ratings may exist for The Bachelorette. For example, The Bachelorette may be a new or relatively new program, while The Bachelor may have been shown for two previous seasons. In such circumstances, the implicit or explicit ratings of similar programs, such as The Bachelor, may be used to socially rank The Bachelorette.

The degree of similarity of programs may also be user selectable. For example, a program degree of similarity slider (not illustrated) may be manipulated by the viewer 14 to identify a desired degree of similarity. A value of 100 may indicate that only ratings associated with the identical program are used to socially rank a program. A value of 90 may indicate that the ratings of programs that are identical, and those programs deemed to have a 90% or higher degree of similarity to the actual programs be considered. In an alternate embodiment, the degree of similarity may be taken into consideration while determining the social ranking of the programs, wherein ratings of programs that have a higher degree of similarity to the ranked program have a higher weight than ratings of programs that are less similar to the ranked program.

Figure 12:
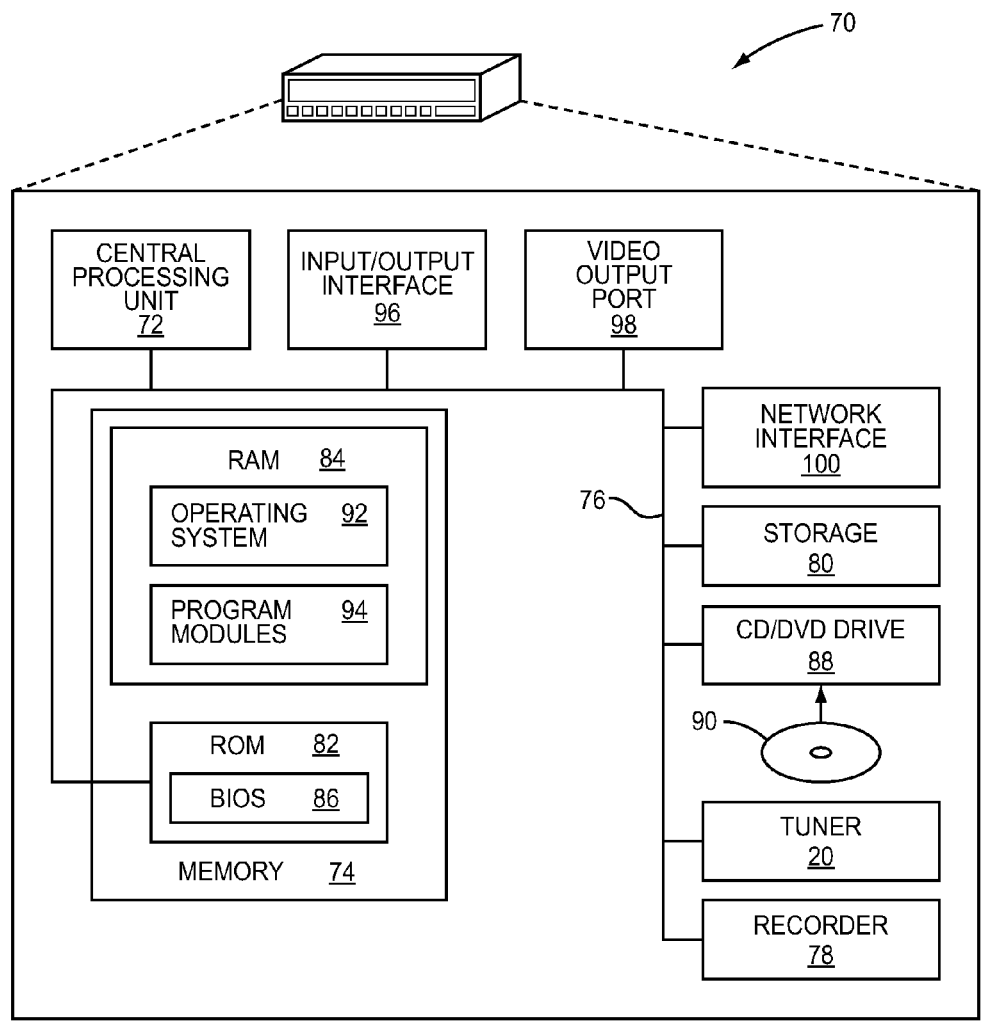
FIG. 12 illustrates an exemplary processing device which may be used to implement a media controller, or a social network server, according to some embodiments.

FIG. 12 illustrates an exemplary processing device 70 which may be used to implement a media controller 12, or a social network server 32, according to some embodiments. The processing device 70 may, when implementing a media controller 12, comprise a set top box, a digital video recorder, an intelligent gaming console, such as the Microsoft® Xbox®, Sony® PlayStation®, and Nintendo® GameCube®, a media console such as the Apple® TV®, personal computers, and the like. In addition to components discussed previously herein, the exemplary processing device 70 may also include a central processing unit 72, a system memory 74, and a system bus 76. The system bus 76 provides an interface for system components including, but not limited to, the system memory 74 and the central processing unit 72. The central processing unit 72 can be any of various commercially available or proprietary processors. Dual microprocessors and other multi-processor architectures may also be employed as the central processing unit 72.

The media controller 12 may include one or more tuners 20 for selecting program content from a communications channel. A recorder 78 may receive a source input from the tuner 20 and store the content onto a storage device, such as the storage 80.

The system bus 76 can be any of several types of bus structures that may further interconnect to a memory bus (with or without a memory controller), a peripheral bus, and a local bus using any of a variety of commercially available bus architectures. The system memory 74 can include non-volatile memory 82 (e.g., read only memory (ROM), erasable programmable read only memory (EPROM), electrically erasable programmable read only memory (EEPROM), etc.) and/or volatile memory 84 (e.g., random access memory (RAM)). A basic input/output system (BIOS) 86 can be stored in the non-volatile memory 82, which can include the basic routines that help to transfer information between elements within the processing device 70. The volatile memory 84 can also include a high-speed RAM such as static RAM for caching data.

The processing device 70 may further include the storage 80, which may comprise, for example, an internal hard disk drive (HDD) (e.g., enhanced integrated drive electronics (EIDE) or serial advanced technology attachment (SATA)) for storage. The processing device 70 may further include an optical disk drive 88 (e.g., for reading a compact disk or DVD 90). The drives and associated computer readable media provide non-volatile storage of data, data structures, computer-executable instructions, and so forth. For the processing device 70, the drives and media accommodate the storage of any data in a suitable digital format. Although the description of computer-readable media above refers to an HDD and optical media such as a CD-ROM or DVD, it should be appreciated by those skilled in the art that other types of media which are readable by a computer, such as Zip disks, magnetic cassettes, flash memory cards, cartridges, and the like, may also be used in the exemplary operating environment, and further, any such media may contain computer-executable instructions for performing novel methods of the disclosed architecture.

A number of program modules can be stored in the drives and volatile memory 84 including an operating system 92 and one or more program modules 94 which implement the functionality described herein. It is to be appreciated that the embodiments can be implemented with various commercially available operating systems or combinations of operating systems. All or a portion of the embodiments may be implemented as a computer program product, such as a computer usable medium having a computer readable program code embodied therein. The computer-readable program code can include software instructions for implementing the functionality of embodiments described herein. The central processing unit 72 in conjunction with the program modules 94 in the volatile memory 84 may serve as a control system for the processing device 70 that is adapted to implement the functionality described herein.

In one embodiment, the program modules 94 may be implemented in software and stored in the volatile memory 84. However, the present disclosure is not limited thereto, and in other embodiments, the program modules 94 may be implemented in software, hardware, firmware, or any combination thereof. When implementing the media controller 12, the program modules 94 may include modules for obtaining the identity of the viewer 14, socially ranking programs based on rating data, causing the display of program representations, and other functionality described herein with regard to the media controller 12. When implementing the social network server 32, the program modules 94 may include modules for obtaining the rating information of programs derived from users, profile matching, and other functionality described herein with regard to the social network server 32.

A user may be able to enter commands and information into the processing device 70 through one or more wired/wireless input devices, for example, a keyboard and a pointing device, such as a mouse (not illustrated). Other input devices (not illustrated) may include a microphone, an infrared (IR) remote control, a joystick, a game pad, a stylus pen, a touch screen, or the like. These and other input devices are often connected to the central processing unit 72 through an input device interface 96 that is coupled to the system bus 76 but can be connected by other interfaces such as a parallel port, an IEEE 1394 serial port, a game port, a universal serial bus (USB) port, an IR interface, etc.

The processing device 70 may drive a separate or integral display device 16, which may also be connected to the system bus 76 via an interface, such as a video output port 98. The processing device 70 may operate in a networked environment using a wired and/or wireless communication network interface 100. The network interface 100 can facilitate wired and/or wireless communications to the network 26 (FIG. 1).

The processing device 70 may be operable to communicate with any wireless devices or entities operatively disposed in wireless communication, for example, a printer, a scanner, a desktop and/or portable computer via wireless technologies, such as Wi-Fi and Bluetooth, for example.

For purposes of illustration embodiments have been described herein where certain functionality is performed on the media controller 12 or the social network server 24. However, such functionality could be distributed differently among the media controller 12 or the social network server 24 as desired. For example, the social network server 24 could perform the social ranking of the programs, and provide the program identifiers corresponding to the programs, and the corresponding social rank, along with other information such as the users who have implicitly or explicitly rated such programs, to the media controller 12.

Embodiments have been provided herein for purposes of illustration and explanation, but those skilled in the art will recognize that many additional and/or alternative embodiments are possible. Those skilled in the art will recognize improvements and modifications to the embodiments. All such improvements and modifications are considered within the scope of the concepts disclosed herein and the claims that follow.

What is claimed is:

1. A method for presenting a program representation, comprising:
   sending, by a media controller to a server, at least one user-identifying criterion for use in identifying a plurality of identified users from a plurality of users, the plurality of identified users being a subset of the plurality of users;
   based on the user-identifying criterion, obtaining, by the media controller, program rating information derived from the plurality of identified users regarding a corresponding plurality of programs that are currently being accessed by the identified users;
   determining a social ranking of the plurality of programs based on the program rating information; and
   causing a display of a plurality of program representations to a viewer, each of the plurality of program representations comprising a non-textual image, wherein the plurality of program representations represent corresponding ones of the plurality of programs and a display of a plurality of user icons, each user icon identifying one user of the plurality of identified users, wherein each user icon is displayed in association with the program representation that corresponds to the program currently being accessed by the one user of the plurality of identified users, and wherein each program has a social rank and the program representation of the program is sized based on the social rank of the program with respect to the social rank of other programs represented by other displayed program presentations.

2. The method of claim 1, wherein each of the plurality of identified users is identified based on a degree of separation value corresponding to the each of the plurality of identified users with respect to the viewer.

3. The method of claim 2, wherein the plurality of identified users is identified based on the degree of separation value corresponding to each of the plurality of identified users with respect to the viewer by comparing the degree of separation value corresponding to each of the plurality of identified users to a viewer selectable threshold degree of separation value.

4. The method of claim 3 wherein the viewer selectable threshold degree of separation value is greater than 1, and wherein the plurality of identified users include a plurality of users that have a direct relationship with the viewer and a plurality of users that have an indirect relationship with the viewer.

5. The method of claim 2, further comprising providing, by the media controller, a threshold degree of separation value to identify the plurality of identified users.

6. The method of claim 1, wherein determining the social ranking of the plurality of programs based on the program rating information further comprises determining the social ranking of the plurality of programs based on a number of the plurality of identified users who are currently accessing each of the plurality of programs.

7. The method of claim 1, wherein determining the social ranking of the plurality of programs based on the program rating information further comprises determining the social ranking of the plurality of programs based on viewer preference information identifying a priority for at least some of the plurality of identified users.

8. The method of claim 1, wherein the program rating information derived from each of the plurality of identified users comprises a rating value provided by the each of the plurality of identified users that rates at least one of the plurality of programs.

9. The method of claim 8, wherein determining the social ranking of the plurality of programs based on the program rating information comprises determining the social ranking of the plurality of programs based on an average of rating values of the plurality of programs by the plurality of identified users.

10. The method of claim 9, wherein determining the social ranking of the plurality of programs based on the program rating information further comprises determining the social ranking of the plurality of programs based on received viewer preference information identifying a priority for at least some of the plurality of users.

11. The method of claim 1, wherein each of the plurality of identified users is identified based on a match between a viewer profile and a user profile corresponding to the each of the plurality of identified users.

12. The method of claim 11, wherein the match between the viewer profile and the profile of each of the plurality of identified users is based on an identified threshold degree of similarity value.

13. The method of claim 1, wherein the program rating information derived from each of the plurality of identified users comprises a rating value provided by the each of the plurality of identified users that rates at least one of the plurality of programs.

14. The method of claim 1, wherein causing the display of the plurality of program representations to the viewer further comprises causing the display of a first program representation and a second program representation, wherein the first program representation has a first social rank that is greater than a second social rank of the second program representation, and wherein the first program representation has a greater size than the second program representation.

15. The method of claim 1, further comprising displaying the plurality of program representations with a differentiating visual characteristic comprising a size of the corresponding each of the plurality of program representations.

16. The method of claim 15, wherein the differentiating visual characteristic comprises a color of a border of the corresponding each of the plurality of program representations.

17. The method of claim 1, further comprising displaying the plurality of program representations with a differentiating visual characteristic comprising a background color of the corresponding each of the plurality of program representations.

18. The method of claim 1, wherein a first plurality of identified users of the plurality of identified users are identified based on a degree of separation value corresponding to the each of the first plurality of identified users with respect to the viewer, and wherein a second plurality of identified users of the plurality of identified users are identified based on a match between a viewer profile and a user profile corresponding to the each of the second plurality of identified users.

19. The method of claim 1, wherein each of at least some of the plurality of identified users are identified based on a degree of separation value corresponding to the each of the at least some of the plurality of identified users with respect to the viewer, and on a match between a viewer profile and a user profile corresponding to the each of the at least some of the plurality of identified users.

20. The method of claim 1, wherein the program rating information derived from a first group of the plurality of identified users comprises information identifying a one of the plurality of programs accessed by a corresponding each of the plurality of identified users in the first group, and the program rating information derived from a second group of the plurality of identified users comprises a rating value provided by a corresponding each of the plurality of identified users in the second group that rates at least one of the plurality of programs.

21. The method of claim 1, wherein each program representation comprises real-time video imagery of the corresponding ones of the plurality of programs.

22. The method of claim 1, further comprising receiving, by the media controller, a plurality of user identifiers, each of the plurality of user identifiers identifying a different one of the plurality of identified users.

23. The method of claim 1, further comprising:
   causing a display of a plurality of genre buttons, each genre button corresponding to a particular genre of a plurality of genres;

receiving a selection of one genre button of the plurality of genre buttons; and wherein the display of the program representations comprises a display of only program representations of corresponding ones of the plurality of programs that are of the particular genre that corresponds to the one genre button.

24. The method of claim 1 wherein the program representation of the program is sized based on the social rank of the program with respect to the social rank of other programs represented by other displayed program presentations with respect to the viewer.

25. A media controller, comprising:

a network interface adapted to communicate with a network; and a control system comprising a processor and coupled to the network interface, the control system adapted to:

obtain program rating information derived from a plurality of identified users regarding a corresponding plurality of programs that are currently being accessed by the plurality of identified users, the plurality of identified users identified from a plurality of users based on at least one user-identifying criterion;

determine a social ranking of the plurality of programs based on the program rating information; and cause a display of a plurality of program representations to a viewer, each of the plurality of program representations comprising a non-textual image, wherein the plurality of program representations represent corresponding ones of the plurality of programs and a display of a plurality of user icons, each user icon identifying one user of the plurality of identified users, wherein each user icon is displayed in association with the program representation that corresponds to the program currently being accessed by the one user of the plurality of identified users, and wherein each program has a social rank and the program representation of the program is sized based on the social rank of the program with respect to the social rank of other programs represented by other displayed program presentations.

26. The media controller of claim 25, wherein each of the plurality of identified users is identified based on a degree of separation value corresponding to the each of the plurality of identified users with respect to the viewer.

27. A computer program product, comprising a non-transitory computer readable medium having a computer readable program code embodied therein, the computer readable program code adapted to be executed to implement a method for presenting a program representation, the method comprising:

sending, to a server, at least one user-identifying criterion for use in identifying a plurality of identified users from a plurality of users, the plurality of identified users being a subset of the plurality of users;

based on the user-identifying criterion, obtaining program rating information derived from the plurality of identified users regarding a corresponding plurality of programs that are currently being accessed by the identified users;

determining a social ranking of the plurality of programs based on the program rating information; and causing a display of a plurality of program representations to a viewer, each of the plurality of program representations comprising a non-textual image, wherein the plurality of program representations represents corresponding ones of the plurality of programs and a display of a plurality of user icons, each user icon identifying one user of the plurality of identified users, wherein each user icon is displayed in association with the program representation that corresponds to the program currently being accessed by the one user of the plurality of identified users, and wherein each program has a social rank and the program representation of the program is sized based on the social rank of the program with respect to the social rank of other programs represented by other displayed program presentations.

\* \* \* \* \*